United States Patent
Matsumoto et al.

(10) Patent No.: US 6,571,222 B1
(45) Date of Patent: May 27, 2003

(54) TRADING SYSTEM

(75) Inventors: Shinichi Matsumoto, Fukuoka (JP); Ken-ichi Takeshita, Fukuoka (JP); Yoshiyuki Seguchi, Fukuoka (JP); Toshihiro Ide, Fukuoka (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/373,530

(22) Filed: Aug. 12, 1999

(30) Foreign Application Priority Data

Feb. 12, 1999 (JP) .......................................... 11-034765

(51) Int. Cl.⁷ .............................................. G06F 17/00
(52) U.S. Cl. ............................... 705/80; 705/64; 705/67
(58) Field of Search ............................. 705/37, 64, 35, 705/67, 36, 80, 75; 380/201, 202, 76; 717/1, 3, 4, 11, 108, 7, 8, 64; 713/200, 201, 170, 177

(56) References Cited

U.S. PATENT DOCUMENTS 5,905,974 A * 5/1999 Fraser et al. .................. 705/37
6,338,050 B1 * 1/2002 Conklin et al. ............... 705/80

FOREIGN PATENT DOCUMENTS

| JP | 410027036 A | * | 1/1998 |
| JP | 10-222221 | | 8/1998 |
| JP | 10-240663 | | 9/1998 |

OTHER PUBLICATIONS

Progress Software Delivers Powerful Solution for Building Internet Transaction Processing Applications, Sep. 23, 1996.*

* cited by examiner

Primary Examiner—Pierre E. Elisca
(74) Attorney, Agent, or Firm—Katten Muchin Zavis Rosenman

(57) ABSTRACT

A trading system wherein each client and a trader respectively have a metadata generating portion for describing character string type parameters of each operation with metadata including a service type and a service type context which is supplementary information of the service type individually or all together, and a metadata interpreting portion for interpreting the metadata in its entirety. The client requesting a registration, an export, or an import to the trader can include authentication information and authority information in the metadata, whereby an authentication processing portion of the trader performs an authentication processing based on the authentication information and the authority information.

8 Claims, 29 Drawing Sheets

FIG. 16A

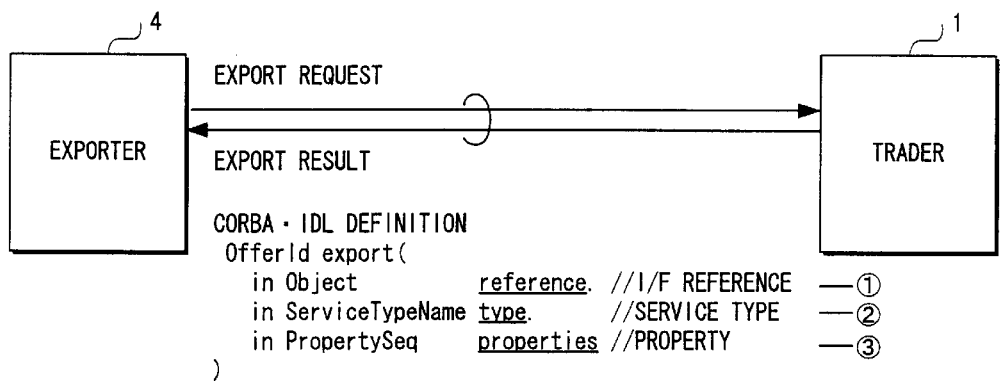

FIG. 16B

METADATA DESCRIPTION OF PARAMETER

① 
```
<rdf:RDF>
    <rdf:Description about="IOR: × × × × ×"traderns:InstanceOf=reference>
<rdf:RDF>
```

② 
```
<rdf:RDF>
    <rdf:Description about=SvcTypeC Traderns:InstanceOf=CORBASvcType>
    <rdf:Description about=ContextX traderns:ContextOf=SvcTypeC >
<rdf:RDF>
```

③ 
```
<rdf:RDF>
    <rdf:Description about=propertyd traderns:Type=Integer>
    <rdf:Description about=propertyd traderns:Value=0 >
<rdf:RDF>
```

FIG. 17A

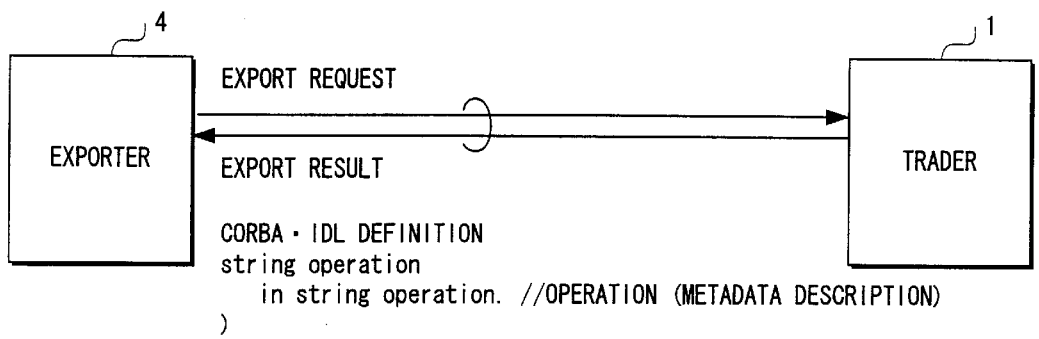

EXPORTER — EXPORT REQUEST / EXPORT RESULT — TRADER

CORBA · IDL DEFINITION
string operation
    in string operation. //OPERATION (METADATA DESCRIPTION)
)

FIG. 17B

METADATA DESCRIPTION OF PARAMETER

```
<rdf:RDF>
   <rdf:Description>
     <rdf:propObj SvcA/>
     <rdf:propName traderns:InstanceOf/>
     <rdf:value SvcTypeC/>
     <rdf:InstanceOf Property/>
     <Traderns:export traderns:someone/>
   <rdf:Description>
     <rdf:Description aboutt=ContextX traderns:ContextOf=SvcTypeC >
     <rdf:Description about=PropertyD traderns:Value=0>
     <rdf:Description about=ServiceA ifReference=ior × × × × × >
<rdf:RDF>
```

TRADING SYSTEM

BACKGROUND OF THE INVENTION

1. Field of the Invention

The present invention relates to a trading system and in particular to a trading system which supports dynamic communications between software units called objects in a distributed object oriented environment based on the CORBA method.

The CORBA (Common Object Request Broker Architecture) method is a standard architecture of the distributed object oriented environment which is provided by OMG (Object Management Group) for realizing the distributed object oriented environment. Equipments of the distributed object oriented environment are to be presented by each vendor according to this standard.

In the distributed object oriented environment in conformity to the CORBA method, processing requests can be transferred between objects and the processings can be realized by the cooperation of the objects without worrying about the differences of architectures and operating systems of computers or of programming languages.

Requests/responses between clients and servers in the CORBA method are mediated by an object request broker (ORB). In the CORBA method, functions such as naming service or trader service which are generally required in a distributed object environment are defined besides the broker. Efficiency in construction of the distributed system can be further improved by using such services as common facilities.

In the CORBA method, a concept corresponding to an object in the object oriented method is called an interface and a concept corresponding to a method is called an operation, so that a client is required to obtain an interface reference (a reference type for object in C++) in order to call a server.

When an operation in an interface reference is called, a corresponding method in a remote server is called automatically. Namely, for the processing of the CORBA method, the interface reference of a desirable server to be called should be obtained in the first place. In the CORBA method, for clients to obtain interface references, several common facilities are supposed as mentioned above. The naming service is a service in which the server name and the server entity correspond to each other, e.g. a service corresponding to searching a telephone number of a person to be called in white pages. On the other hand, the trader service corresponds to a service for searching a telephone number of a person to be called in yellow pages, which is expected as a trading system where the server name and the server entity need not correspond to each other.

2. Description of the Related Art

Such a trading system corresponds to a broker ORB shown in FIGS. 31A and 31B, comprises a plurality of clients 4 and 5 and a trader 1 as shown in FIG. 31B, and performs (1) service type registration processing and (2) service import/export processing as described below:

(1) Service Type Registration Processing (see FIG. 31A)

a) A client 3, which may be any client, requesting the registration of a service type gives a service type name and its super type name, a property definition which defines a property name, type, and mode, and an interface name to the trader 1, thereby requesting the registration of a new service type.

(2) Service Import/export Processing (see FIG. 31B)

a) The server client 4 which is called an exporter gives the service type name, a property value, and its own interface reference to the trader 1, thereby requesting the registration of the service. In response, the trader 1 maintains the correspondence between the service type and the interface reference of the server.

b) The client 5 which is called an importer gives a necessary service type name, a constraint, and the like to the trader 1, thereby requesting the offer of service information. The trader 1 selects services which conform to the service type, conditions of the constraint, and the like.

c) The trader 1 returns the information of a service group selected in the procedure b) to the client 5.

d) The client 5 uses the interface reference received from the trader 1 to call an object of the server 4.

Processings between the trader 1 and its clients (hereinafter collectively referred to with a symbol "7") will now be described referring to FIG. 32.

For each type of the above-mentioned service type registration processing (1) and service import/export processing (2), and the like, the trader 1 comprises an interface 11 and a processing portion 12. The service type information saved by the trader 1 is saved in a service type repository 13 in the trader 1, and the service information is saved in a service offer repository 14 in the trader 1.

Receiving a processing request from the client 7 at the corresponding portion within the interface 11, the trader 1 transfers the processing to the corresponding portion of the processing portion 12. Each processing portion 12 takes out suitable information from the service type repository 13, the service offer repository 14, or an interface repository 6 which is located outside of the trader 1 to perform the processing. The processing result is returned to the client 7 of the trader 1 through the interface 11.

Next, details of internal processing of such a trading system will be described below:

(1) Service Type Registration Processing (see FIG. 33A)

When newly registering a service type, the service type registration requesting client 3 calls a service type registration interface 131 of the trader 1.

Extracts from a CORBA.IDL definition for the service type registration are given as follows:

```
IncarnationNumber add_type (
    in CosTrading::ServiceTypeName name,
    in Identifier if_name,
    in PropStructSeq props,
    in ServiceTypeNameSeq super_types
):
```

Having received a registration request from the service type registration interface 131, a service type registration processing portion 132 takes out super type information corresponding to a super type name in the registration request from a service type repository 13. The processing portion 132 also takes out interface definition information of the service in the registration request from the interface repository 6 which is located outside of the trader 1.

The trader 1 examines the correspondence between a super type-sub type relationship in the service type repository 13 and a successional relationship of the interface definition in the interface repository 6, confirms the validity in case both relationship correspond mutually, and saves a new service type in the service type repository 13.

When the processing ends normally, the service type registration interface 131 allots an incarnation number to the registration processing and returns the processing to the service type registration requesting client 3.

(2.1) Service Export Processing (see FIG. 33B)

In the export processing of a service, the exporter 4 calls an export interface 141 of the trader 1. Extracts from a CORBA.IDL definition for this are given as follows:

OfferId export (
   in Object reference,
   in ServiceTypeName type,
   in PropertySeq properties
);

Having received an export processing request from the export interface 141, an export processing portion 142 takes out service type information designated in the request from the service type repository 13. If a property type in a parameter coincides with the property type in a service type definition and if a property value of an mandatory mode is given in the export processing request, the request is valid, so that the trader 1 stores the service in a service offer repository 14.

When the processing ends normally, the export interface 141 returns an offer ID to the exporter 4.

(2.2) Service Import Processing (see FIG. 33C)

In the import processing of a service, the importer 5 calls an import interface 151 of the trader 1. Extracts from a CORBA.IDL definition for this are given as follows:

void query (
   in ServiceTypeName type,
   in Constraint constr,
   in Preference pref,
   in PolicySeq policies,
   in SpecifiedProps desired_props,
   in unsigned long how_many,
   out OfferSeq offers,
   out OfferIterator offer_itr,
   out PolicyNameSeq limits_applied
);

Having received an import processing request form the import interface 151, an import processing portion 152 takes out service type information designated in the request from the service type repository 13, and performs the processing according to the following procedures (see FIG. 34).

1) Extract the service type name designated in the import processing request and service information of the sub type from the service offer repository 14.
2) Calculate a constraint expression in the import processing request based on the property value of each service and select the services for which the expression value becomes true as an import processing object.
3) Sort the services to be import-processed based on a preference in the import processing request.
4) Return a number of services to the importer as designated by a policy parameter in the import processing request.

By applying this trading system to the distributed object oriented environment, the flexibility between the clients and the server is increased and the efficiency in system designing, mounting, and operation is improved. However, there still remain problems as under-mentioned:

[1] Collision of Service Type Names

A service type name in a trader must be unique. Therefore, when a registration processing of a service type in the trader is tried, there are cases where the names collide. For example, a communication service "Asynchronous Transfer Mode" and a financial service "Automatic Teller Machine" cannot be registered the same name "ATM", so that they must have different names.

Also, in the export processing of a service offer, the trader does not know in what intention the exporter classified its own service into the service type, that is, whether the "ATM" means the "Asynchronous Transfer Mode" or the "Automatic Teller Machine". In the import processing, the trader cannot know the meaning of the service type name designated by the importer.

On the other hand, there is a link or the like as means for the cooperative operation of a plurality of traders. In the presence of a link, the import processing request is transferred accordingly, but contradictions are caused unless the meanings of the service types and the services are in conformity among the traders.

For example, if the service type "ATM" is used as meaning the "Asynchronous Transfer Mode" in a trader while as meaning the "Automatic Teller Machine" in another trader, the mixed services of different meanings are to be offered to the importer.

[2] Client Authentication by Trader

A trader receives export processing requests from various exporters to construct a service offer repository. Also, it receives service type registration requests from various clients to construct a service type repository.

A trader is an object forming a basis of the distributed environment so that the information in a trader must not be rewritten illegally or carelessly. Therefore, it is necessary to incorporate such an authentication means that a certain service type can only be registered from a certain object into an interface between a trader and its client which is closely linked with the functions of the trader.

[3] Import Processing Authority

For security reasons and the like, there are cases where an exporter desires to make the service available only from limited clients (importers). In such cases, the trader can even offer the whereabouts of the service to the importer as usual and perform some kind of authentication processing between the server and the client. However, in order not to inform the importer of the existence of the server carelessly, it is preferable to be able to designate for the trader the range where the service can be opened to public at the time of the export processing.

However, in the existing trading system, it is not possible to designate a range where the service can be opened to public at the time of the export processing nor to indicate the authority indicating the service which enables the import processing by the importer.

SUMMARY OF THE INVENTION

It is accordingly an object of the present invention to provide a trading system which avoids the collision of service type names or enables a client authentication by a trader or authority assignment for import processing.

Viewpoints for Solving Problems

[1] Collision of Service Type Names

This problem is caused by the fact that there is no means for indicating the contents of service type/service offer in more detail than the service type name and the property in the form recognizable by the trader. The trader only determines the coincidence/non-coincidence (agreement/disagreement) at the time of export processing/import processing with regard to the service type name as a mere character string and does not judge the meaning of the service type name. In order to deal with this problem, it is necessary to describe the meaning of the service type in a machine-recognizable and extensible form.

[2] Client Authentication by Trader

This problem is caused by the fact that there is no procedures for indicating information related to such a client of the trader as an import processing requestor or a service type registration processing requester. This problem can be dealt with by installing a mechanism for the client of the trader to affix signature information to the processing request in order to indicate that the request has been issued by a proper client and a mechanism for the trader to decrypt the signature information and to compare the information with the authority information.

[3] Import Processing Authority

This problem is also caused by the fact that there is no procedures for indicating the information related to such a client of the trader as the import processing requestor or the service type registration processing requester. This problem can be dealt with by installing a mechanism for indicating the identity of the importer to the trader. In order to perform an efficient authentication, an authentication procedure by a challenge-response procedure is required.

Means for realizing the above-mentioned viewpoints will be described hereafter, respectively.

[1] Context-based Trading Processing

An arrangement of the present invention according to claim 1 is shown in FIG. 1A. The client 7 of the trader 1, which may be a service type context registration requesting client, a service type registration requesting client, an exporter, an importer, or the like, individually describes, at a metadata generating portion 75, a character string type parameter of an operation made at a request processing portion 71 with metadata including a service type and a service type context which is a supplementary or generic information of the service type and transfers the same to the trader 1 through an interface 72.

In the trader 1 which receives the processing request from the client 7, the interface 11, as stated in claim 8, can be the one common to the prior art trader. However, a metadata interpreting portion 15 which interprets the received processing request as a metadata, or data describing data, and extracts the character string type parameter of the operation, and a metadata generating portion 16 which transforms the processing result at a processing portion 12 into metadata are provided between the interface 11 and the processing portion 12

Also, as a database to which the processing portion 12 refers, there are the service type repository 13, within the trader 1, which saves the service type information including the service type context and the service offer repository 14 which saves the information of the export-processed service existing as stated in claims 10 and 11. Moreover, there is an interface repository 6 existing outside of the trader 1, as stated in claim 12, which is a database for saving a service interface definition required for examining the conformity of the service type.

On the side of the client of the trader 1, a metadata interpreting portion 76 which interprets the response received from the trader 1 as a metadata is provided between the request processing portion 71 which requests the processing to the trader 1 and the trader interface 72 which interfaces with the trader besides the above-mentioned metadata generating portion 75.

An arrangement of the present invention according to claim 2 is shown in FIG. 1B. The difference from FIG. 1A is that the interfaces of the trader 1 are made a common interface 17.

Namely, in the client 7, contents of the request processing are transformed all together into a metadata description at the metadata generating portion 75 and transferred to the trader 1 through the interface 72. In the trader 1, the processing request is received at the common interface 17 and the whole processing request is interpreted as a metadata at the metadata interpreting portion 15.

After the interpretation, the processing is dispatched to each part of the processing portion 12 according to the contents, or the parameters, of the processing request which are contained in the metadata description. The processing result is returned to the client 7 after being transformed into a metadata form at the metadata generating portion 16.

In FIG. 1B, as an arrangement corresponding to claims 3–7, an authentication processing portion 18 is provided, as shown by dotted lines, which is called as required from each part of the processing portion 12 to perform an authentication processing.

Effects of the present invention having such compositions will now be described.

In each claim, the service type context is defined as supplementary information, or generic information, of the service type in order to avoid the collision of service type names and the confusion of concepts indicated by the service types. A name space of the service type name is divided according to the service type context. If the service type contexts are different, the service type names do not collide. A schematic example of the information within the service type repository 13 in which the service type name space is structured by the service type context is shown in FIG. 2A, which will be described as follows:

(1) Service Type Structure (see FIG. 2A)

The name space of the service type (abbreviated as SvcType shown) name composed of the service type name is divided according to the service type contexts into contexts such as X, Z, and X.Y.

An inclusive relationship can be set between service type contexts. In this example, the context X includes the context X.Y.

A default context 130 which includes the whole set of service types is defined. The default context 130 includes all of the service type contexts directly or indirectly. In this example, the default context 130 directly includes SvcTypes A, D, and E.

As long as the service type contexts are different, a plurality of service types having the same name can exist. In this example, the SvcType A exists in the default context 130, the service type contexts X.Y and Z.

How to handle the service type contexts in the trader will now be described.

A trading processing flow based on the service type context is shown in FIG. 4. Namely, the client 7 which requests the processing to the trader 1 adds the service type context name which is the supplementary information of the service type name as a service type name parameter within the processing request and transforms the same into the metadata description at the metadata generating portion 75. The metadata-described parameter is transferred to the trader 1 with other parameters through the interface 72.

Having received the processing request at the interface portion 11 (step S1), the trader 1 interprets the metadata-described parameters at the metadata interpreting portion 15 (step S2), and transfers the request to each part of the processing portion 12. After the processing is finished in each part of the processing portion 12 (step S3), the processing result is transformed into the metadata description at the metadata generating portion 16, and transferred to the origin of the processing request through the interface 11 (step S4).

Having received the processing result, the client 7 interprets the metadata-described parameters in the response at the metadata interpreting portion 76 and performs the processing according to the response result at the request processing portion 71.

The processings within the trader 1 based on the concept of the context will now be described.

(2) Service Type Context Registration Processing (see FIG. 2B)

In an initial state of the service type information within the service type repository 13 (see FIG. 2A), if the trader 1 receives a request with the default context 130 designated as a superior service type context to newly register a service type context W, the trader 1 generates the new service type context W, shown by a thick line, within the default context 130.

(3) Service Type Registration Processing (see FIG. 2C)

The case where the service type context X.Y is designated with FIG. 2B being made the initial state and a new service type E is registered under a super type A is considered.

The trader 1 retrieves the service type context X.Y and generates the new service type E as a sub type of the service type A if the existence of the service type A within the context X.Y is confirmed.

Although the service type A exists in the default context 130 and the context Z besides the context X.Y, the service type which assumes the super type can be uniquely determined since the concept of the context functions.

(4) Export Processing (see FIG. 2D)

The case where the service type context Z is designated with FIG. 2C being made the initial state and a new service is export-processed to a service type D is considered.

The trader 1 retrieves the service type context Z and registers a new service $NS_{VC}$ in the service type D if the existence of service type D within the context Z is confirmed. Although the service type D exists in the default context 130 besides the service type context Z, the service type of the new service can be uniquely determined since the concept of the context functions.

(5) Import Processing (see FIGS. 3A–D)

The case where the trader 1 receives an import processing request in the state of FIG. 2D is considered. According to the service type name in the import processing request and the service type context designation, the service type of the service which is the import processing object will be determined as follows:

In case the service type A is import-processed without a context designation, the service type A and its sub types, i.e. the service type D and the service type E, existing within the default context 130; the service type A and its sub type, i.e. the service type E, existing within the service type context X.Y included in the default context 130; and the service type A within the service type context Z correspond therewith (see FIG. 3A).

In case the service type A is import-processed by designating the service type context X, the service type A in the context X.Y within the service type context X and the service type E which is the sub type of the service type A correspond therewith (see FIG. 3B).

In case the service type E is import-processed by designating the service type context Z, there is no corresponding service type since the service type E does not exist within the service type context Z (see FIG. 3C).

In case the service type E is import processed by designating the default context, there is no context designation, so that the service type E in the default context 130, the service type E in the context X, and the service type E in the context X.Y correspond therewith (see FIG. 3D).

[2] Authentication of Trader's Client

In the present invention according to claims 3–7, 11, and 13, an authentication of the trader's client is performed. The client 7 of the trader 1 can set authority information in the service type context, the service type, and the service within the repository 13 possessed by the trader, and the client 7 must present in the processing request a signature coinciding with the authority.

(1) Authentication Processing Arrangement (see FIG. 5)

The authentication is performed at the times of the service type context registration, the service type registration, the service export, and the import processing.

The client 7 of the trader 1 transforms the authentication information indicating that it has the authority to make the processing request and the authority information to be set in the information generated as a result of the processing, such as the service type context, the service type, and the service, together with other parameters of the processing request, into a metadata form at the metadata generating portion 75, which is transferred to the trader 1 through the interface 72.

Having received the processing request from the client 7 through the common interface 17, the trader 1 interprets and extracts the above-mentioned authority information and authentication information at the metadata interpreting portion 15, and then determines at the authentication processing portion 18 with this authentication information whether or not the client 7 has the authority for the request.

If the authority is recognized, the trader 1 performs the ordinary processing at each part of the processing portion 12 and sets the authority information in the generated information, such as the service type context, the service type, and the service. The processing result is transformed into the metadata description at the metadata generating portion 16 and returned to the client 7 through the interface 17.

(2) Client Authentication Procedure (see FIG. 6)

The client 7 of the trader 1 can set the authority information in the service type context, the service type, and the service to be registered in trader 1. The authority information is described in metadata with other parameters and transferred to the trader (step S1). Setting the authority information enables restrictions such as not accepting the processing if an appropriate signature is not affixed in the following request from the client.

Having received the request from the client, the trader extracts the authority information at the metadata interpreting portion (step S1), and stores the same in the service type repository or the service offer repository as follows:

1) An authority information for restricting the client 7 capable of registering a subordinate service type context included in a new service type context is stored in the service type repository 13 with the context information (claims 3, 11).

2) An authority information for restricting the client 7 capable of performing the registration processing of a sub type under a new service type is stored in the service type repository 13 with the service type information (claims 4, 11).

3) An authority information restricting the client 7 capable of performing the registration processing of a new service type under a new service type context is stored in the service type repository 13 with the service type context information (claims 5, 11).

4) An authority information for restricting the client 7 capable of performing the export processing of a service as a service type is stored in the service type repository 13 with the service type information (claims 6, 11).

5) An authority information for restricting the client or importer acapable of performing the import processing of a service to be registered is stored in the service offer repository 14 with the service information (claims 7, 11, 13).

Namely, in the present invention according to claim 7, the authentication processing of the importer is performed based on the authority enabling the import processing of the service designated by the exporter (step S5). The exporter can set the authority information to the service to which the exporter itself has performed the export processing, while the importer must present in the import processing request the signature coinciding with this authority.

After having decided whether or not it is a valid processing request at each part of the processing portion 12 (steps S6, S3), the authority information for restricting the importer of the service is stored in the service offer repository 14 of the trader 1 as a result of the authentication (step S7).

(3) Importer Authentication Procedure

The authentication of the importer is performed according to a challenge-response procedure between the trader and the importer. The processing flow between the trader and the importer at the time of authentication is shown in FIGS. 7A and 7B, which will be described herebelow referring to FIG. 8.

1) Having received the import processing request, the import processing portion 12 in the trader 1 requests the authentication processing portion 18 to generate the challenge information for authenticating the importer or the client 5 (step S8). The generated challenge information is transformed into the metadata description at the metadata generating portion 16 and transferred to the importer 5 for inquiry (step S9).

2) The importer 5 hashes or simply encrypts the received challenge information after encrypting the same with its own private key and responds to the trader 1 with the metadata-described information of the encryption method and the hash method.

3) Having received the response from the importer 5, the trader 15 compares the encrypted and hashed information with the challenge information at the authentication processing portion to perform the authentication (step S10), and returns the import processing result in the same way as the ordinary import processing if the response is found appropriate (step S11).

Thus, the trading system according to the present invention introduces a metadata description for the request parameter and the response parameter transferred between the trader and its client, thereby enabling the service type context of the service type, the authentication information, the authority information of the client, and the like to be described in a strict and extensible form.

BRIEF DESCRIPTION OF THE DRAWINGS

FIGS. 16A and 16B are diagrams illustrating a metadata description (1) of a trading system according to the present invention;

FIGS. 17A and 17B are diagrams illustrating a metadata description (2) of a trading system according to the present invention;

Throughout the figures, the same reference numerals indicate identical or corresponding portions.

DESCRIPTION OF THE EMBODIMENTS

An embodiment of the trading system according to the present invention having been described referring to FIG. 1 will be described hereafter along a trading processing flow shown in FIGS. 9A and 9B.

Figure 1A:
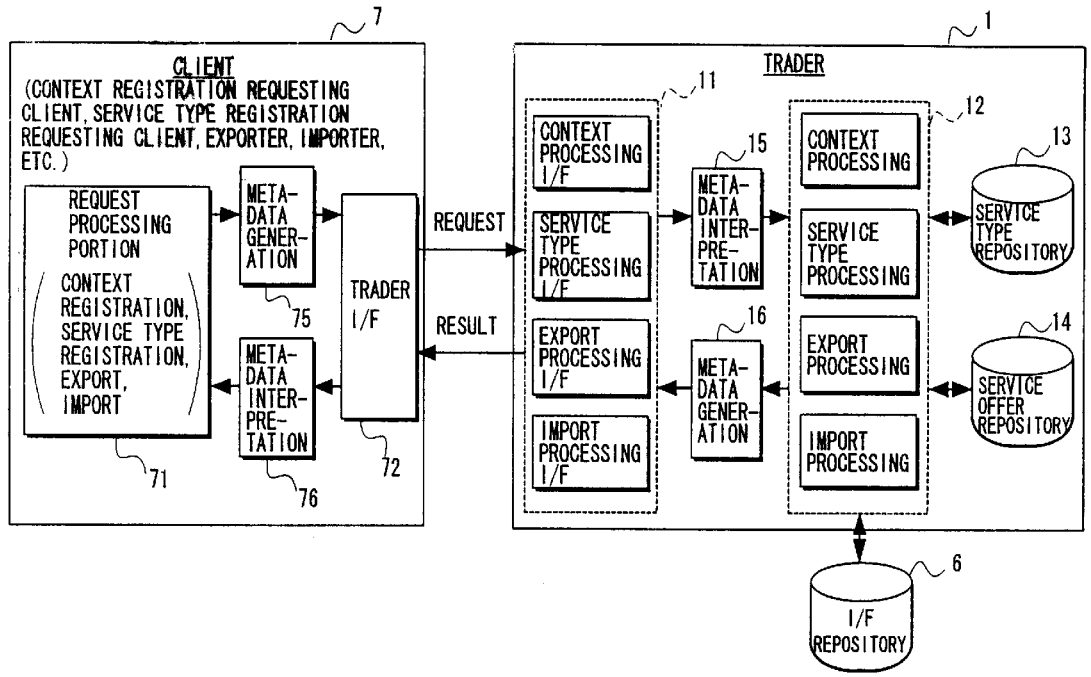
FIGS. 1A and 1B are block diagrams illustrating an arrangement principle of a trading system according to the present invention.
Figure 9A:
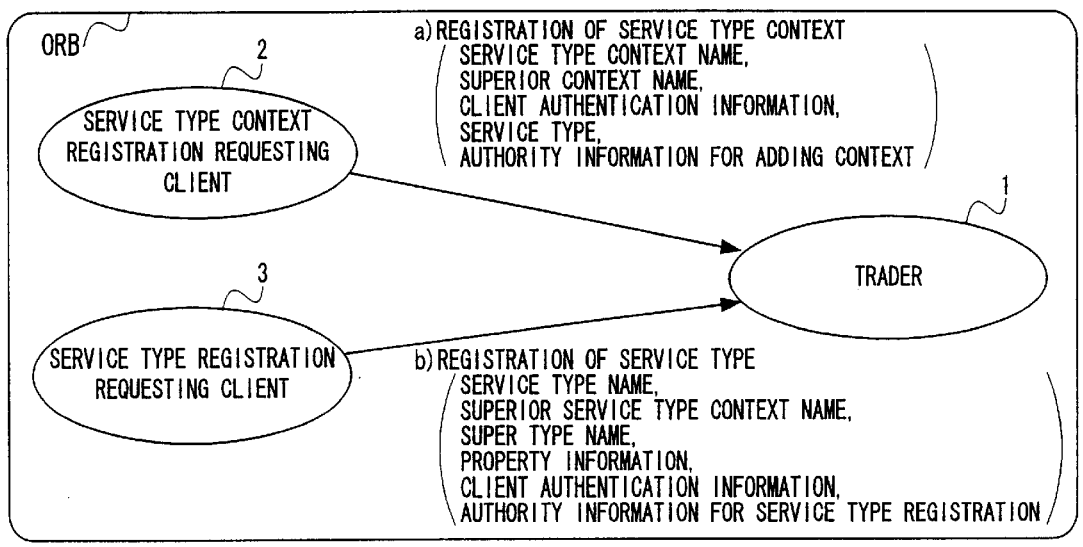
FIGS. 9A and 9B are sequence charts schematically illustrating an embodiment of a trading system according to the present invention.

(1) Service Type Context and Service Type Registration Processing Procedure (see FIG. 9A)

a) A service type context registration requesting client 2, corresponding to the client 7 in FIG. 1A, transfers the service type context name and its superior context name to the trader 1 to request the registration processing of a new service type context. At the same time, the client 2 transfers the authentication information indicating the authority for registering the service type as well as the authority information required for registering a service type context and a service type under the new service type context.

b) A service type registration requesting client 3, corresponding to the client 7 in FIG. 1A, transfers the new service type name and its super type name and service type context name, and the property information to the trader and requests the registration of the new service type. At the same time, the client 3 transfers the authentication information indicating the authority for registering the service type and the authority information required for export processing the service of the service type.

Figure 9B:
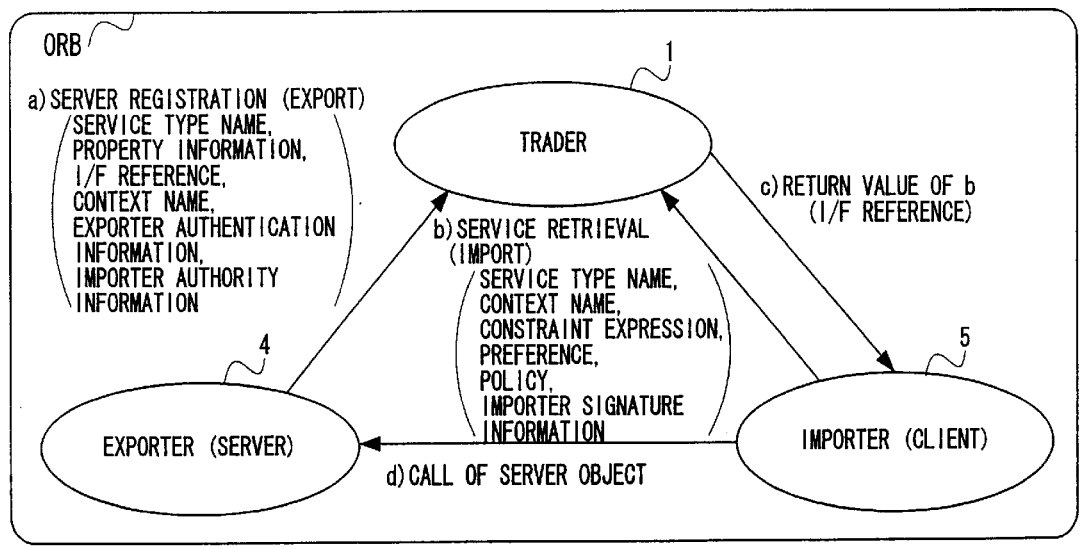

(2) Service Export/import Processing Procedure (see FIG. 9B)

a) An exporter 4, corresponding to the client 7 in FIG. 1A, transfers its own interface (I/F) reference, the service type name, the property value of the service, and the service type context name which is an additional information to the service type to the trader 1 to request the service export processing. At the same time, the exporter 4 transfers the signature information indicating the authority for performing the export processing and the authority information required for performing the import processing of the service.

b) An importer 5, corresponding to the client 7 in FIG. 1A, presents the service type name, the service type context name which is an additional information to the service type, a constraint expression, and the like to request the import processing to the trader 1. At the same time, the importer 5 transfers the authentication information indicating that it has the authority for performing the import processing.

c) The trader 1 returns the information of a selected service group to the importer 5.

d) The client or the importer 5 uses the interface reference previously obtained by performing the import processing to call the server or the exporter 4. The trader 1 no longer participates in this operation.

(3) Embodiment of Metadata Description per Parameter (see FIG. 1A)

(3.1) Operation of Metadata Generating Portion

Figure 10:
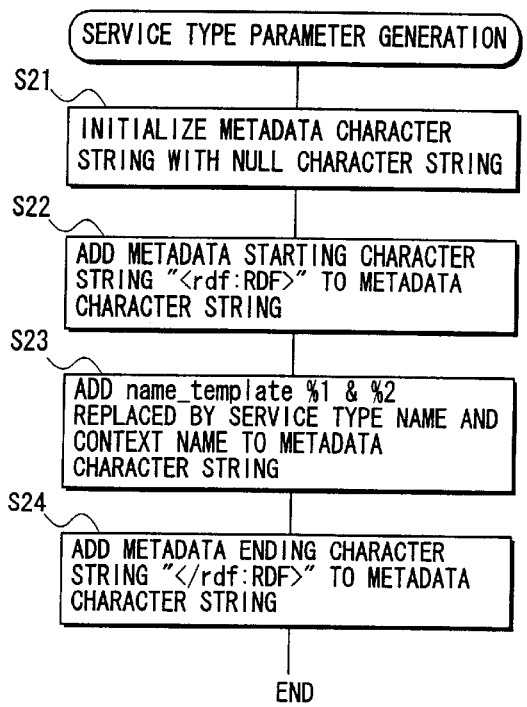
FIG. 10 is a flow chart illustrating the generation of service type name in a metadata form in a trading system according to the present invention.

In the client of the trader, character strings of a fixed format are used for generating a metadata description within the processing request. An embodiment of a service type registration-requesting object when requesting the service type registration in case of an individual description of the parameters with metadata is as follows:

Service Type Parameter Generation (see FIG. 10)

The fixed format character string for the service type parameter is fined as follows:

```
name_template = "<rdf:RDF>
    <rdf:Description about = %1 Traderns:InstanceOf
    =\" CORBASvcType\">
    <rdf:Description about = %2 traderns:ContextOf = %1>
    </rdf:RDF>"
```

Figure 11:
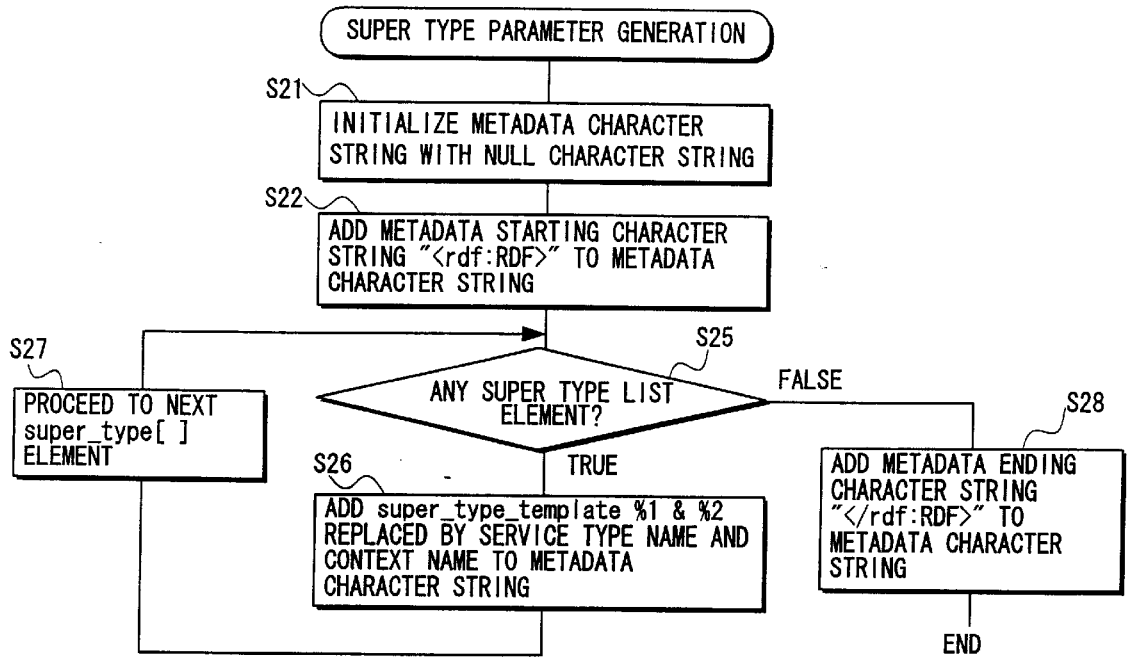
FIG. 11 is a flow chart illustrating the generation of super type name in a metadata form in a trading system according to the present invention.

The generation of the service type parameter follows the flow shown in FIG. 10. This parameter is formed of the metadata description-starting character string "<rdf:RDF>" (steps S21, S22), added with "%1" and "%2" within the name_template character string substituted with the character string of the service type name and the character string of the service type context name respectively (step S23), and finally added with the character string "</rdf:RDF>" which indicates the end of metadata description (step S24).

b) Super Type Parameter Generation (see FIG. 11)

The fixed format character string for the super type parameter is defined as follows:

```
super_type_template = "
    <rdf:Description about = %1 traderns:SubtypeOf = %2>
```

The generation of the super type parameter follows the flow shown in FIG. 11. This parameter is formed of the metadata description-starting character string "<rdf:RDF>", added with "%1" and "%2" within the super_type character string substituted with the character string of the super type name and the character string of the super type context name (steps S25, S26), and finally added with the character string "</rdf:RDF>" which indicates the end of metadata description (steps S27, S28).

(3.2) Operation of Interface

The existing processing can be used for the processing of the interfaces 11 and 72 of the trader 1 and the client 7, respectively. Having received the processing request, the interface transfers the parameter to each part of the processing portion 12 through the metadata interpreting portion 15.

(3.3) Operation of Metadata Interpreting Portion

Figure 12:
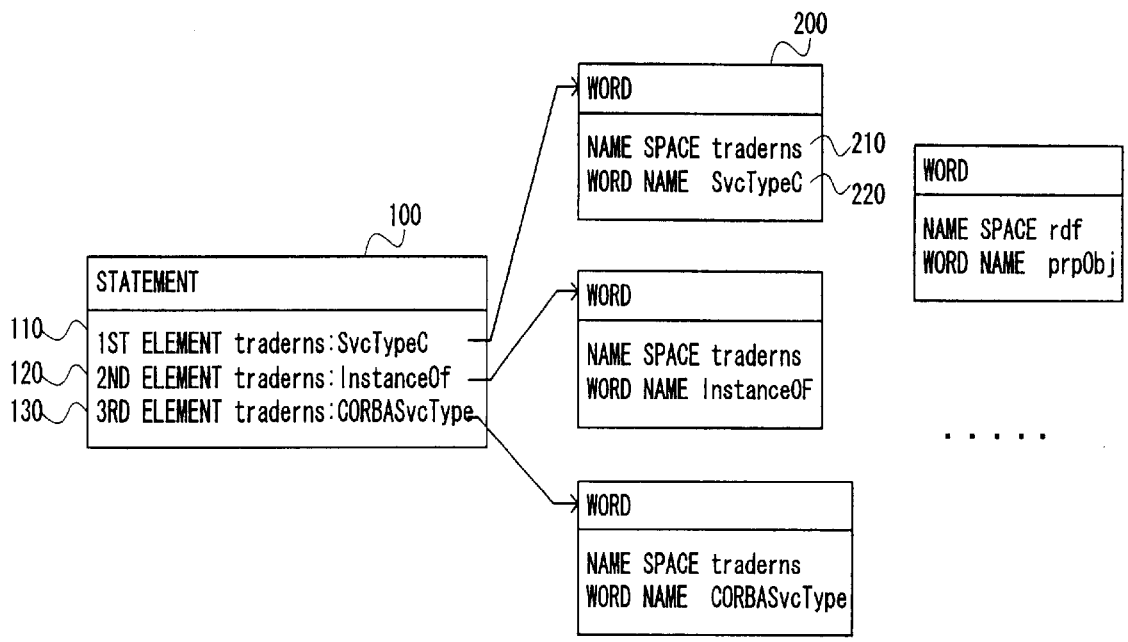
FIG. 12 is a block diagram illustrating a structure example of a metadata dictionary used in a trading system according to the present invention.

The metadata interpreting portion 15 in the trader 1 has a dictionary shown in FIG. 12. The dictionary has a statement portion 100 and a large number of word portions 200. The word portion 200 is composed of a name space 210 and a word name 220. The statement portion 100 is a list for referring three elements 110–130 of the dictionary.

Figure 13:
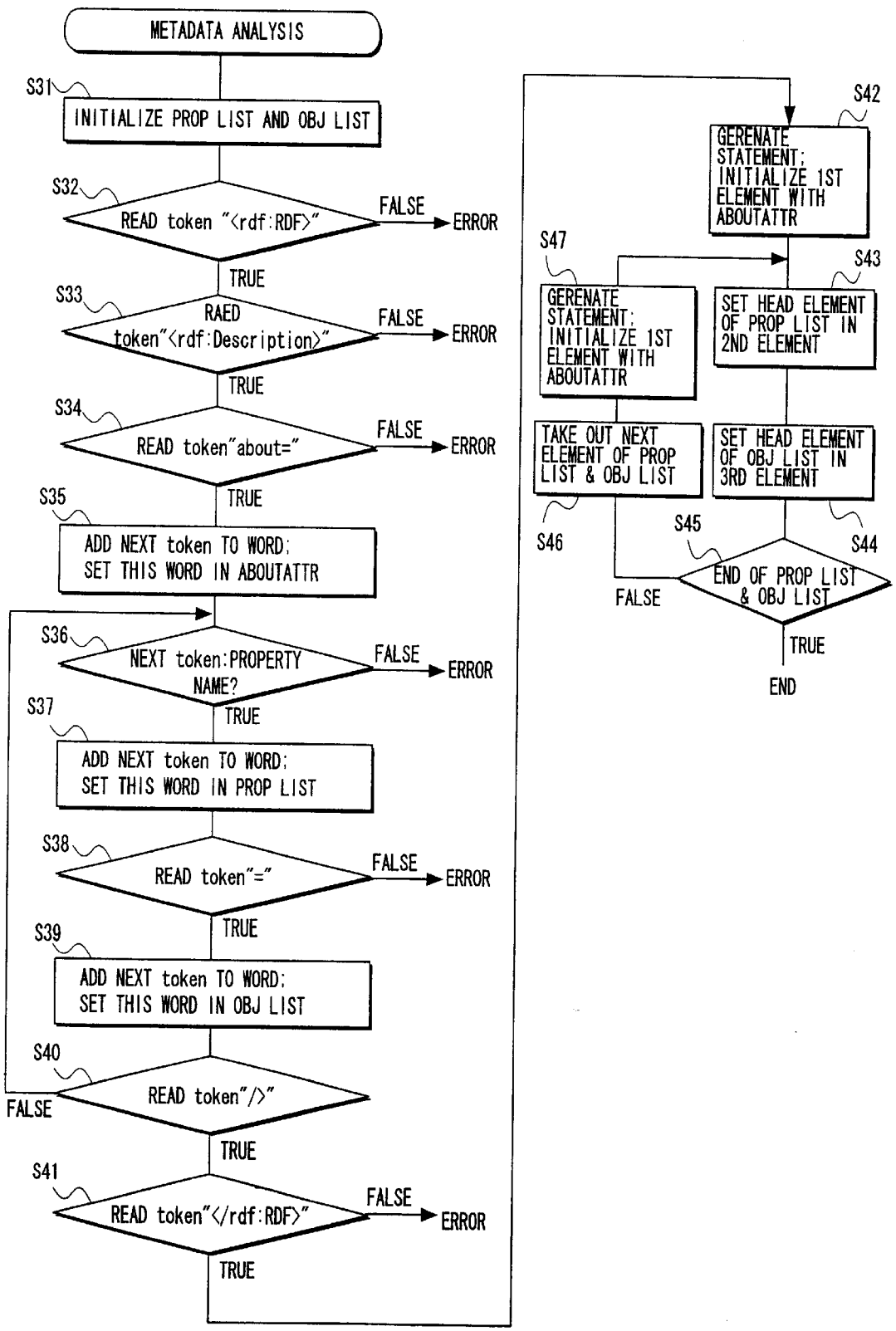
FIG. 13 is a flow chart illustrating an interpretation procedure of metadata in a trading system according to the present invention.

In the metadata interpreting portion 15, an entry is added to the dictionary based on the metadata description received from another object. The processing flow of reading the metadata description and of constructing the dictionary is shown in FIG. 13.

Firstly, after initializing the property list (PROP list) and the object list (OBJ list) (step S31), the metadata description is found to be an error if the character string does not start with "<rdf:RDF>" (step S32). Then, if the character string does not start in the form of metadata description "<rdf: Description about=", it is also found to be an error (step S33, 34). The next token is then added to the word and substituted for an ABOUTATTR (step S35). The ABOUTATTR assumes the first element 110 of the statement.

The next coming token is also added to the word, and simultaneously added to the PROP list (step S36, 37). The element of the PROP list assumes the second element 120 of the statement. If the equal sign "–" is not read next, it is also found to be an error (step S38).

The next token is also added to the word, and simultaneously added to the OBJ list (step S39). The element of the OBJ list assumes the third element 130 of the statement. If a further metadata description follows, it is added to the PROP list and the OBJ list without any modification.

If the description is closed, the statement is generated (step S40, 42). After setting the ABOUTATTR in the first element 110 of generated statement, the elements of the PROP list and the OBJ list are set in the second element 120 and the third element 130, respectively (step S43, 44). If any element of the list still remains (step S45), further statements are generated so that the ABOUTATTR is set in the first element 110 and the elements of the PROP list and the OBJ list is set in the second and the third elements 120 and 130, respectively (step S46, S47, S43, S44). The generation of statement ends when there is no more element of the list.

Figure 14:
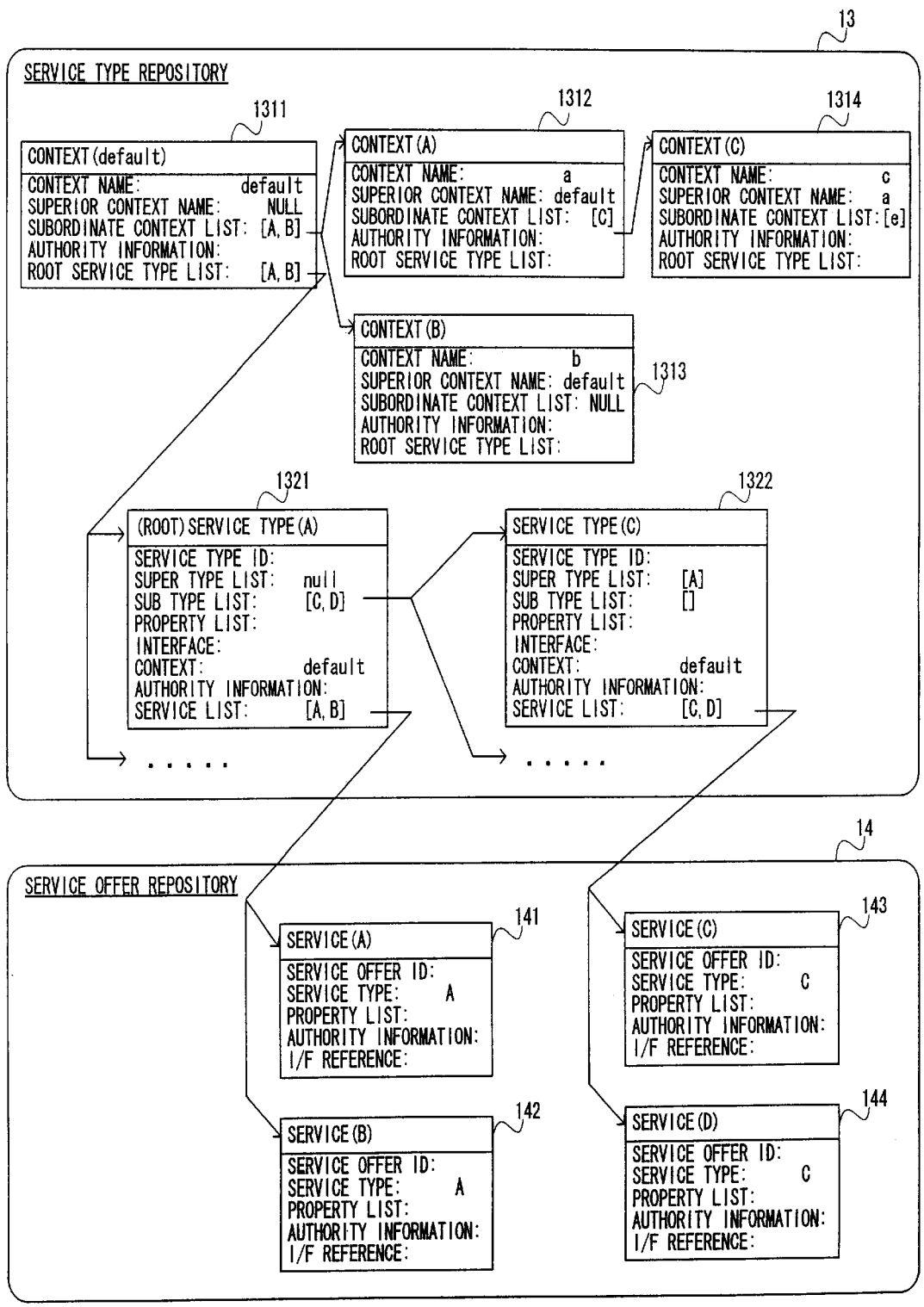
FIG. 14 is a block diagram illustrating a data structure of a repository used in a trading system according to the present invention.

(3.4) Data Structure of Repository (see FIG. 14)

The information on the service type context, the service type, and the service is managed within the trader 1. Such information is saved within the data structure shown in FIG. 14.

The service type repository 13 saves the information on service type contexts 1311, 1312(A)–1314(C) and service types 1321(A) and 1322(C). The service type contexts and the service types form tree structures, respectively.

Each of the service type contexts 1311–1314 has a reference list for its superior service type context and subordinate service type context, thereby forming the tree structure. The superior service type context of the default context 1311 is null. Each of the service type contexts 1311–1314 has a list of root service types which the context includes directly.

Each of the service types 1321 and 1322 has a reference list for its super type and a reference list for its sub type, thereby forming the tree structure. The super type of the root service type 1321 in any service type context is null. Moreover, the service type saves a list of services 141–144 belonging to the service type in the service offer repository 14.

Namely, the services saved in the service offer repository 14 are referenced from the lists in the services (A)–(D) saved by the service type 1321 and 1322, and saves the information on individual services.

Figure 15A:
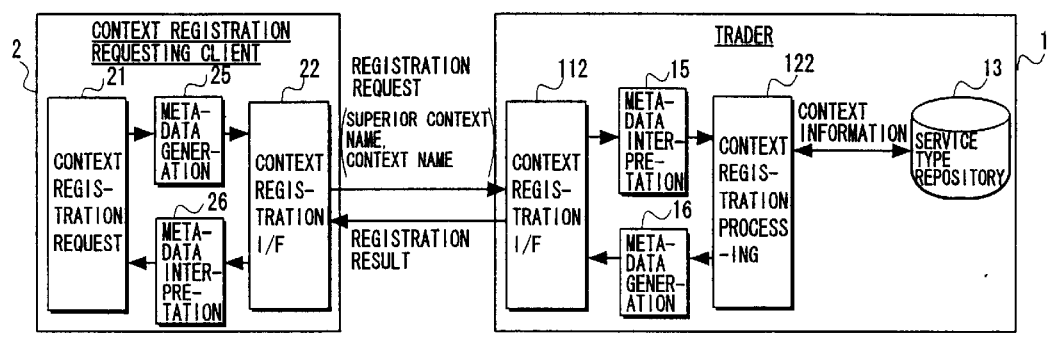
FIGS. 15A–15D are block diagrams illustrating an operation embodiment (1) of a trading system according to the present invention.

(3.5) Service Type Context Registration Processing (see FIG. 15A)

1) Interface Definition

The CORBA.IDL for calling the service type context registration interface is defined as follows:

void add_context(
    in ContextName name,
    in ContextName super_context,
    );

The service type context name whose registration is requested and the superior service type context name are stored in a name parameter and a super_context parameter, respectively to call the above-mentioned add_context operation. If the super_context parameter is a null character string, the service type context is registered as a context directly under the default context.

2) Operations

FIG. 15A schematically shows the operations of the service type context-registration requesting client 2 and the trader 1 shown in FIG. 9A. A service type context-registration request processing portion 21, corresponding to the request processing portion 71 in FIG. 1A, describes the parameters of the service type context information and of the superior service type context information in the metadata form at a metadata generating portion 25, corresponding to the same portion 75 in FIG. 1A, and calls a service type context-registration interface 112, corresponding to the interface 11 in FIG. 1A, of the trader 1 through a context registration interface 22, corresponding to the interface 72 in FIG. 1A.

The service type context-registration interface 112 of the trader 1 transfers the parameter to the metadata interpreting portion 15 and this metadata interpreting portion 15 interprets the parameter as a metadata. Then, a context registration processing portion 122, corresponding to the same portion 12 in FIG. 1A, generates a new context in the service type repository 13 and transforms the result into the metadata form at the metadata generating portion 16 to be returned to the client 2.

Figure 15B:
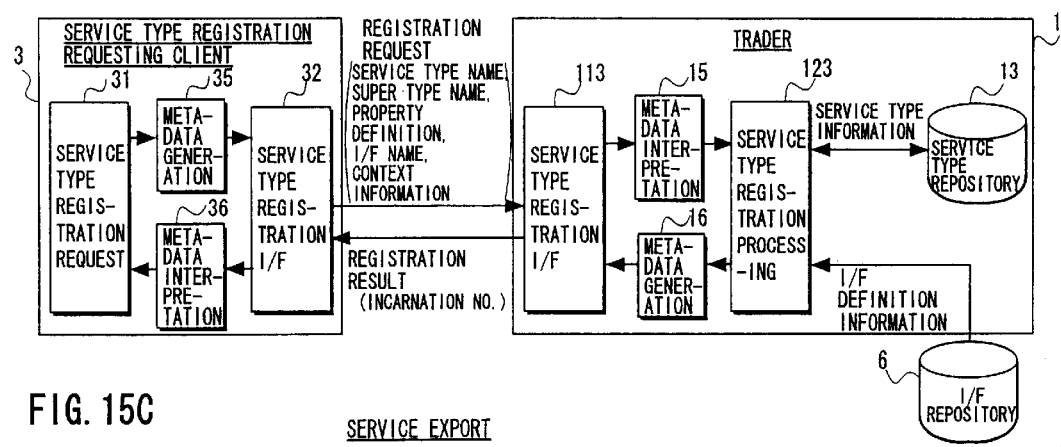

(3.6) Service Type Registration Processing (see FIG. 15B)

1) Interface Definition

In order to perform the service type registration with metadata description, the parameters of the above-mentioned existing interface should be described with metadata individually. When adding the service type context information to the service type name, the description of the name parameter and the super_types parameter should be in metadata description.

For example, a metadata description indicating a statement "The service type C is defined in the service type context X." is given as follows:

```
[SvcTypeC]  --- InstanceOf ---> [CORBASvcType]
[ContextX]  --- ContextOf  ---> [SvcTypeC]
```

This can be rewritten in the following character string form, which assumes the value of the name parameter:

```
<rdf:RDF>
    <rdf:Description about="SvcTypeC" traderns:InstanceOf
    ="CORBASvcType">
    <rdf:Description about="ContextX" traderns:ContextOf
```

-continued

```
        ="SvcTypeC">
    </rdf:RDF>
``` where the RDF (Resource Description Framework) is a framework for describing network resources such as Web pages. In the RDF, the metadata description based on the first order predicate logic is formed to describe the resources.

For example, a metadata description indicating a statement "The service type C is the sub type of the service types A and B." is given as follows:

```
[SvcTypeC]    --- SubTypeOf    ---> [SvcTypeA]
              +-- SubTypeOf    ---> [SvcTypeB]
```

This can be rewritten in the following character string form, which assumes the value of the super_type parameter:

```
    <rdf:RDF>
        <rdf:Description about="ServiceTypeC"
        traderns:SubtypeOf="SvcTypeA">
        <rdf:Description about="ServiceTypeC"
        traderns:SubtypeOf="SvcTypeB">
    </rdf:RDF>
```

Also, a metadata description indicating a statement "The property Propertyd is the property of the service type C, its type is Integer, and its mode is NORMAL." is given as follows:

```
Propertyd]    --- PropertyOf   ---> [SvcTypeC]
              +-- Type          ---> [Integer]
              +-- Mode          ---> [NORMAL]
```

This can be rewritten in the following character string form, which assumes the value of the props parameter:

```
    <rdf:RDF>
        <rdf:Description about="Propertyd"
        traderns:PropertyOf="SvcTypeC">
        <rdf:Description about="Propertyd"
        traderns:Type="Integer">
        <rdf:Description about="Propertyd"
        traderns:Mode="NORMAL">
    </rdf: RDF>
```

2) Operations

The operations of the service type registration-requesting client 3 and the trader 1 are shown in FIG. 15B. A service type registration-request processing portion 31, corresponding to the request processing portion 71 in FIG. 1A, generates the metadata description of the service type name including the service type context information, the super type name, the property definition, and the interface name parameter at a metadata generating portion 35, corresponding to the same portion 75 in FIG. 1A, and calls a service type registration interface 113, corresponding to the interface 11 in FIG. 1A, of the trader 1 through a service type registration interface 32, corresponding to the interface 72 in FIG. 1A.

The service type registration interface 113 of the trader 1 transfers the parameter to the metadata interpreting portion 15 for the interpretation thereof as a metadata. A service type registration-processing portion 123, corresponding to the same portion 12 in FIG. 1A, generates the service type in the service type repository 13 after performing the examination of a new service type by referring to the data in the interface repository 6. After the completion of the processing, the processing result is transformed into metadata at the metadata generating portion 16, and an incarnation number is returned to the client 3.

Figure 15C:
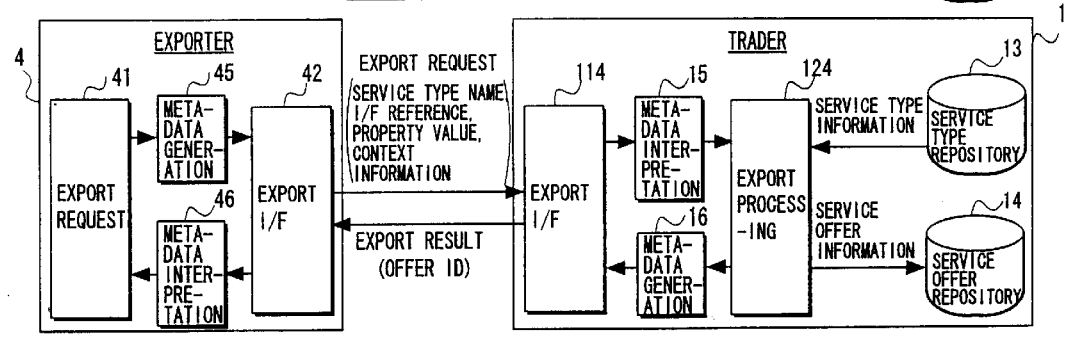

(3.7) Service Export Request Processing (see FIG. 15C)

1) Interface Definition

An export request processing can be defined by the CORBA.IDL as shown by ①–③ in FIG. 16A.

In order to perform the service export-request processing with metadata description, the parameters of the above-mentioned CORBA.IDL interface definition should be described individually with metadata as shown by ①–③ in FIG. 16B. The type parameter indicating the service type name can be described similarly as the name parameter at the time of service type registration.

For example, a metadata description indicating a statement "The type of the property propertyd is Integer and its value is 0" is given as follows:

```
[propertyd]    --- Type    ---> [Integer]
               +-- Value   ---> [0]
```

This can be rewritten in the following character string form (see FIG. 16B ③), which assumes the value of the property parameter:

```
    <rdf:RDF>
        <rdf:Description about = "propertyd"
        traderns:Type = "Integer">
        <rdf:Description about = "propertyd"
        traderns:Value = "0">
    </rdf:RDF>
```

A metadata description indicating a statement "The value of the object reference reference is "IOR:xxxxxxx"." is given as follows:

"IOR:xxxxxxx" - - - InstanceOf→[reference]

This can be rewritten in the following character string form (see FIG. 16B ①), which assumes the value of the reference parameter:

```
    <rdf:RDF>
        <rdf:Description about
            = "IOR:xxxxxxx" traderns:InstanceOf = "reference">
    </rdf:RDF>
```

2) Operations

The operations of the service exporter 4 and the trader 1 are shown in FIG. 15C. A service export request processing portion 41, corresponding to the request processing portion 71 in FIG. 1A, generates metadata description of the parameter including the service type context information of the service at a metadata generating portion 45, corresponding to the same portion 75 in FIG. 1A, and calls an export interface 114, corresponding to the interface 11 in FIG. 1A, of the trader 1 through an export interface 42, corresponding to the interface 72 in FIG. 1A.

The export interface 114 of the trader 1 transfers the parameter to the metadata interpreting portion 15 for the iriterpretation thereof as a metadata. Then, a service export processing portion 124, corresponding to the same portion 12 in FIG. 1A, registers a new service in the service offer repository 14 after examining the service type repository 13, transforms the processing result into metadata at the metadata generating portion 16, and returns the offer ID to the exporter 4.

Figure 15D:
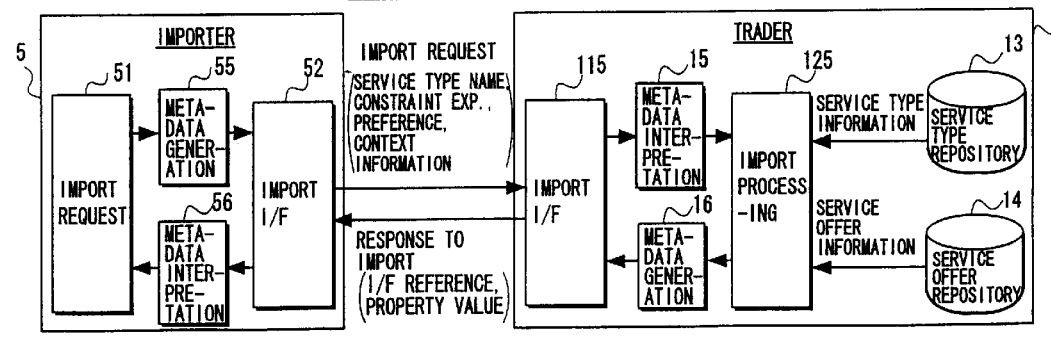

(3.8) Service Import Request Processing (see FIG. 15D)

1) Interface Definition

In order to perform the import request processing with metadata description, the parameters of the above-mentioned existing interface should be described with metadata individually. The type parameter indicating the service type name can be described similarly as the name parameter at the time of service type registration.

For example, a metadata description indicating a statement "The constraint expression is "xxxxxxxx"." is given as follows:

"xxxxxxxx" - - - InstanceOf→[Constraint]

This can be rewritten in the following character string form, which assumes the value of the constr parameter:

```
<rdf:RDF>
  <rdf:Description about "xxxxxxxx" traderns:instanceOf"constr">
<rdf:RDF>
```

Moreover, a metadata description indicating a statement "The preference is "xxxxxxxx"." is given as follows:

"xxxxxxxx" - - - InstanceOf→[Preference]

This can be rewritten in the following character string form, which assumes the value of the pref parameter:

```
<rdf:RDF>
  <rdf:Description about="xxxxxxxx" traderns:instanceOf="pref">
</rdf:RDF>
```

2) Operations

The operations of the service importer 5 and the trader 1 are shown in FIG. 15D. A service import processing portion 51, corresponding to the request processing portion 71 in FIG. 1A, generates metadata description of the parameter including the service type context information of the service for the import processing at a metadata generating portion 55, corresponding to the same portion 75 in FIG. 1A, and calls an import interface 115, corresponding to the interface 11 in FIG. 1A, of the trader 1 through an import interface portion 52, corresponding to the interface 72 in FIG. 1A.

The import interface 115 in the trader 1 transfers the parameter to the metadata interpreting portion 15 for the interpretation thereof as a metadata. Then, an import processing portion 125, corresponding to the same portion 12 in FIG. 1A, examines the relationship between the service types within the service type repository 13 and retrieves the service which is the object of the import processing from the service offer repository 14. The retrieval result is returned to the importer 5 after being transformed into metadata at the metadata generating portion 16.

Figure 1B:
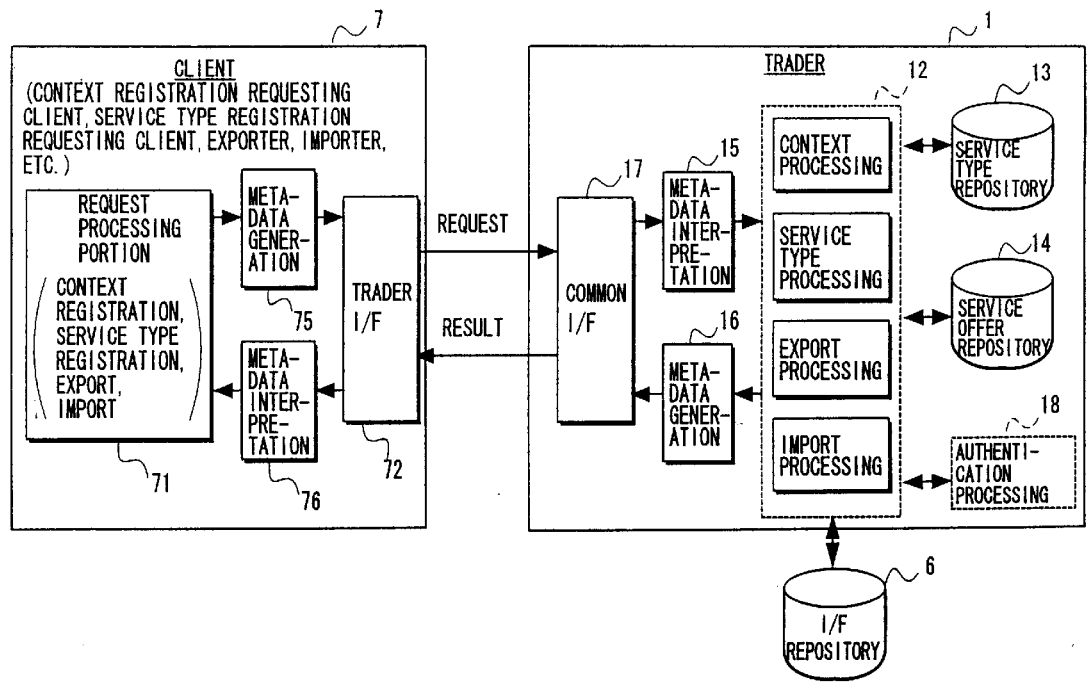
Figure 2A:
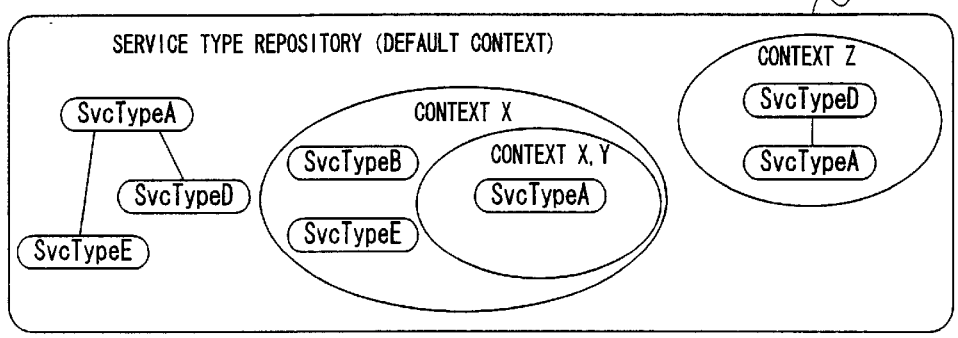
FIGS. 2A–2D are diagrams illustrating an operation principle (1) of a trading system according to the present invention.
Figure 2B:
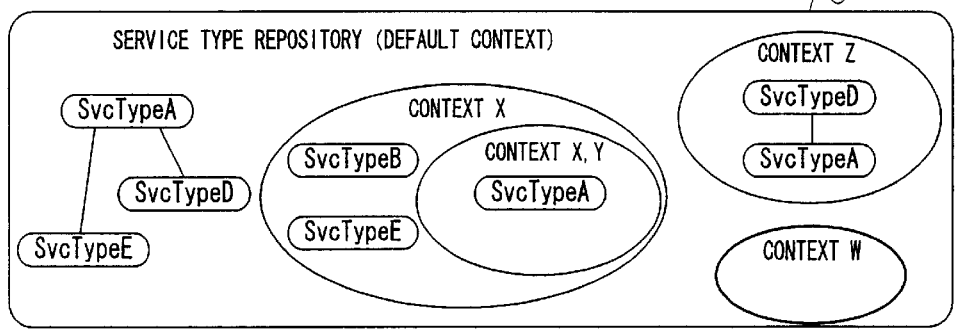
Figure 2C:
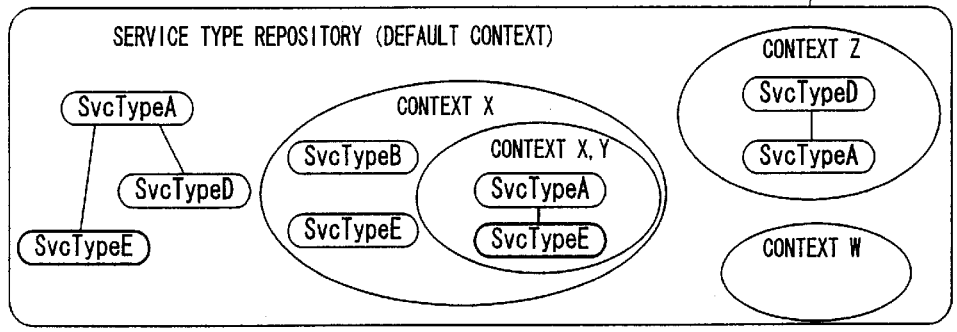
Figure 2D:
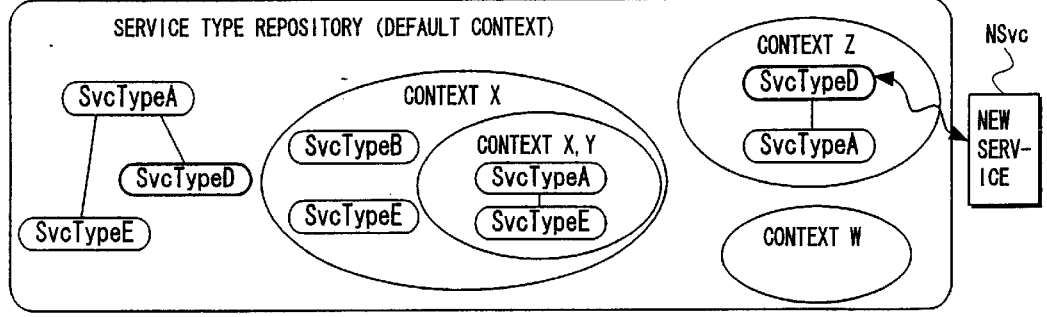
Figure 3A:
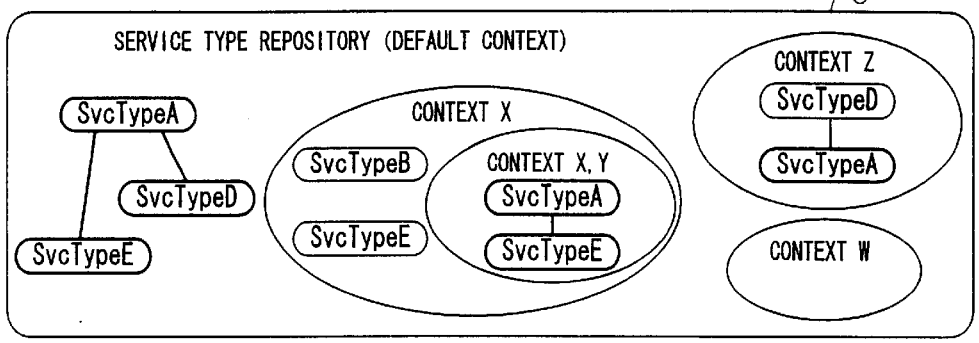
FIGS. 3A–3D are diagrams illustrating an operation principle (2) of a trading system according to the present invention.
Figure 3B:
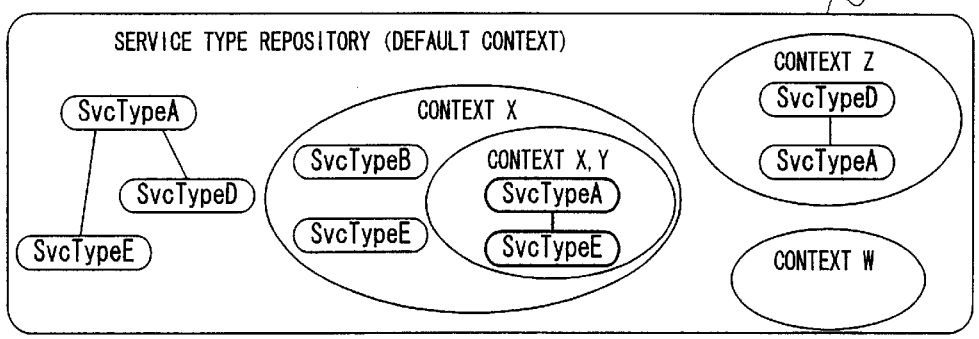
Figure 3C:
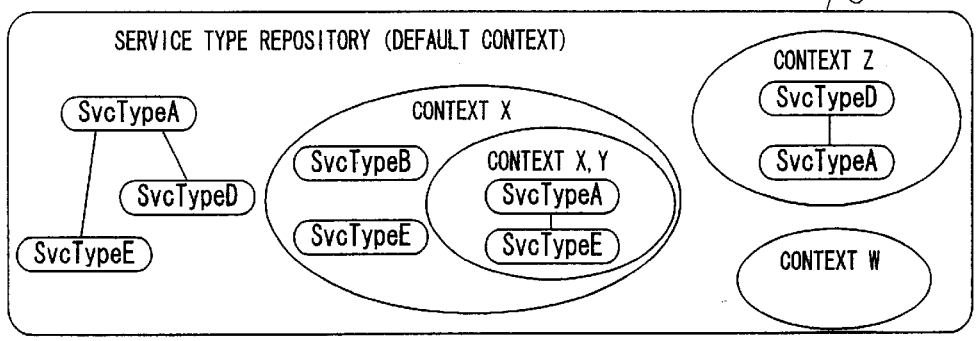
Figure 3D:
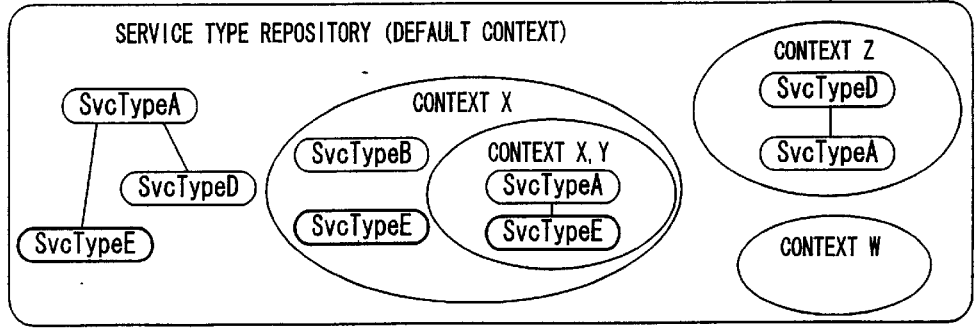
Figure 4:
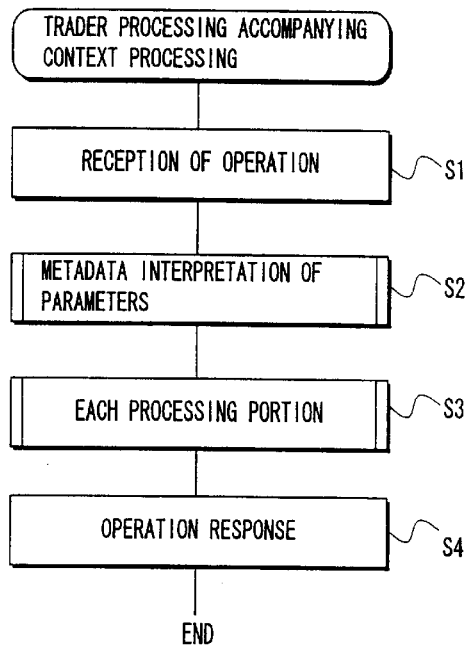
FIG. 4 is a flow chart illustrating a procedure of trading processing a trading system according to the present invention.
Figure 5:
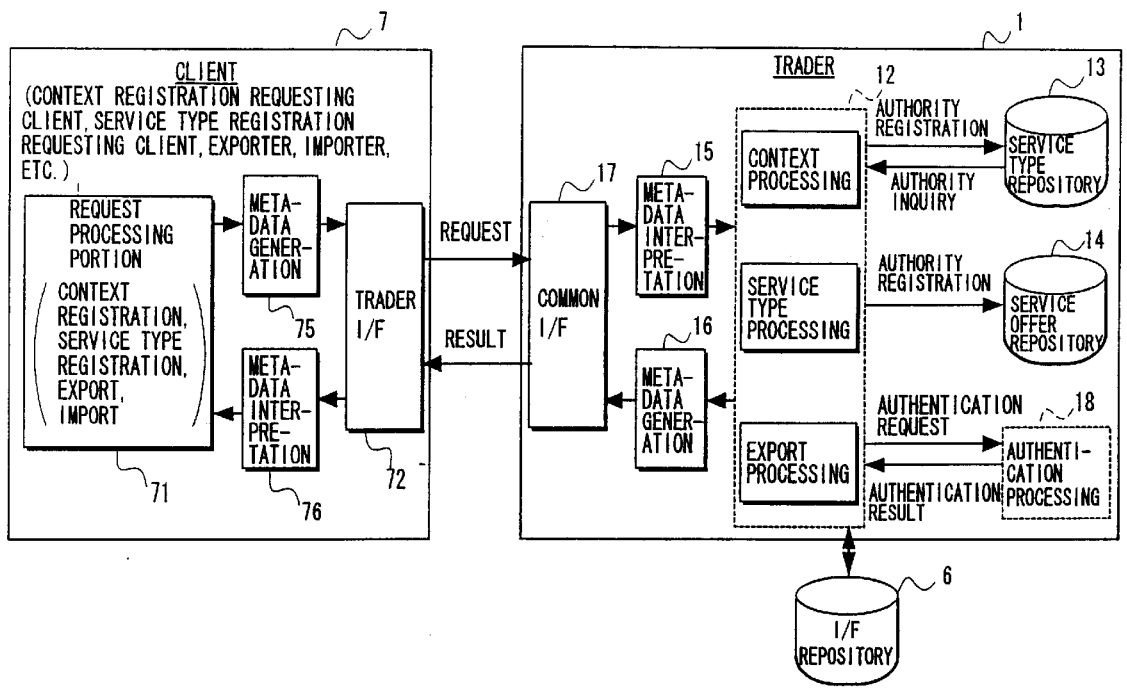
FIG. 5 is a block diagram schematically illustrating an arrangement of authentication processing in a trading system according to the present invention.
Figure 6:
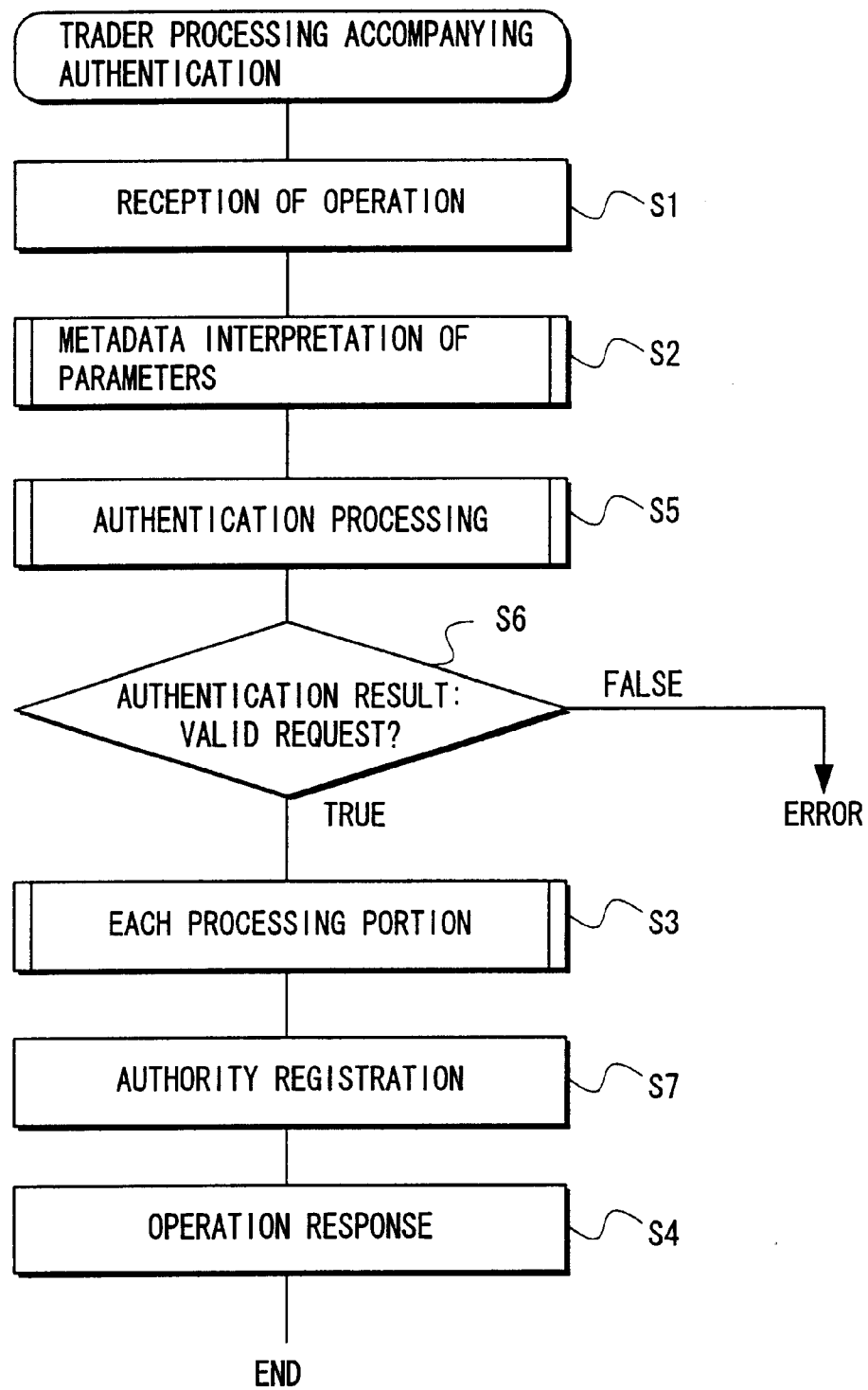
FIG. 6 is a flow chart illustrating a procedure of authentication processing in a trading system according to the present invention.
Figure 7A:
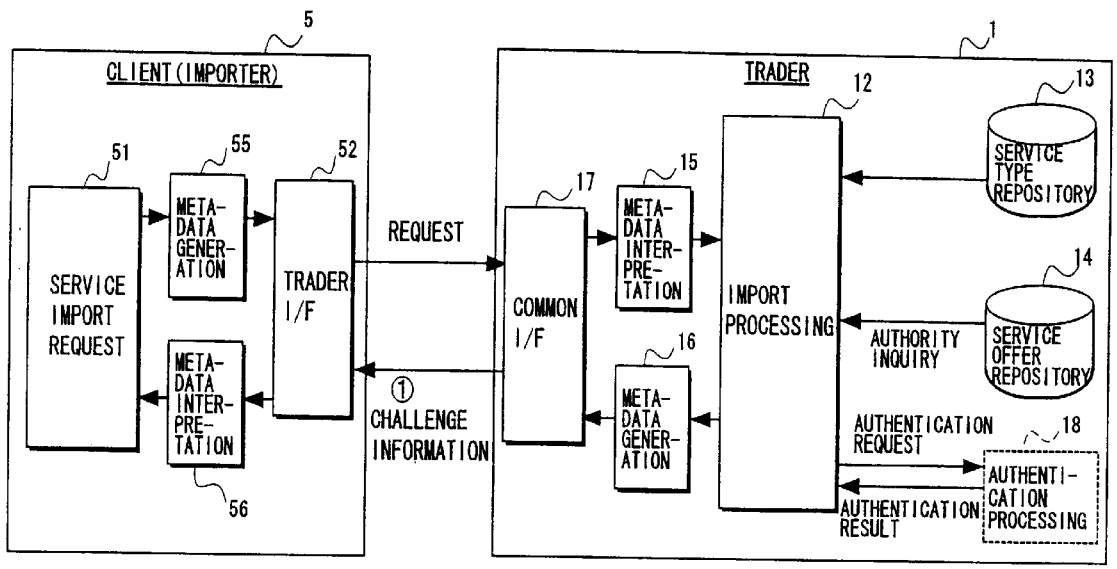
FIGS. 7A and 7B are block diagrams schematically illustrating an arrangement of challenge-response processing in a trading system according to the present invention.
Figure 7B:
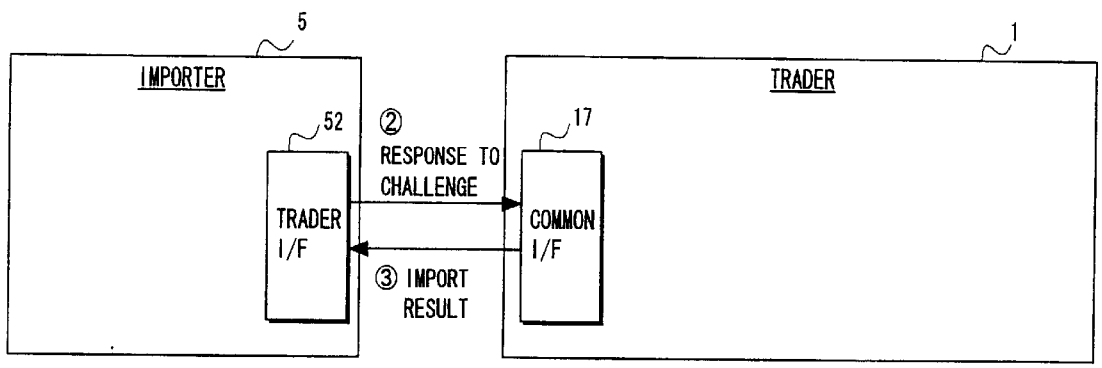
Figure 8:
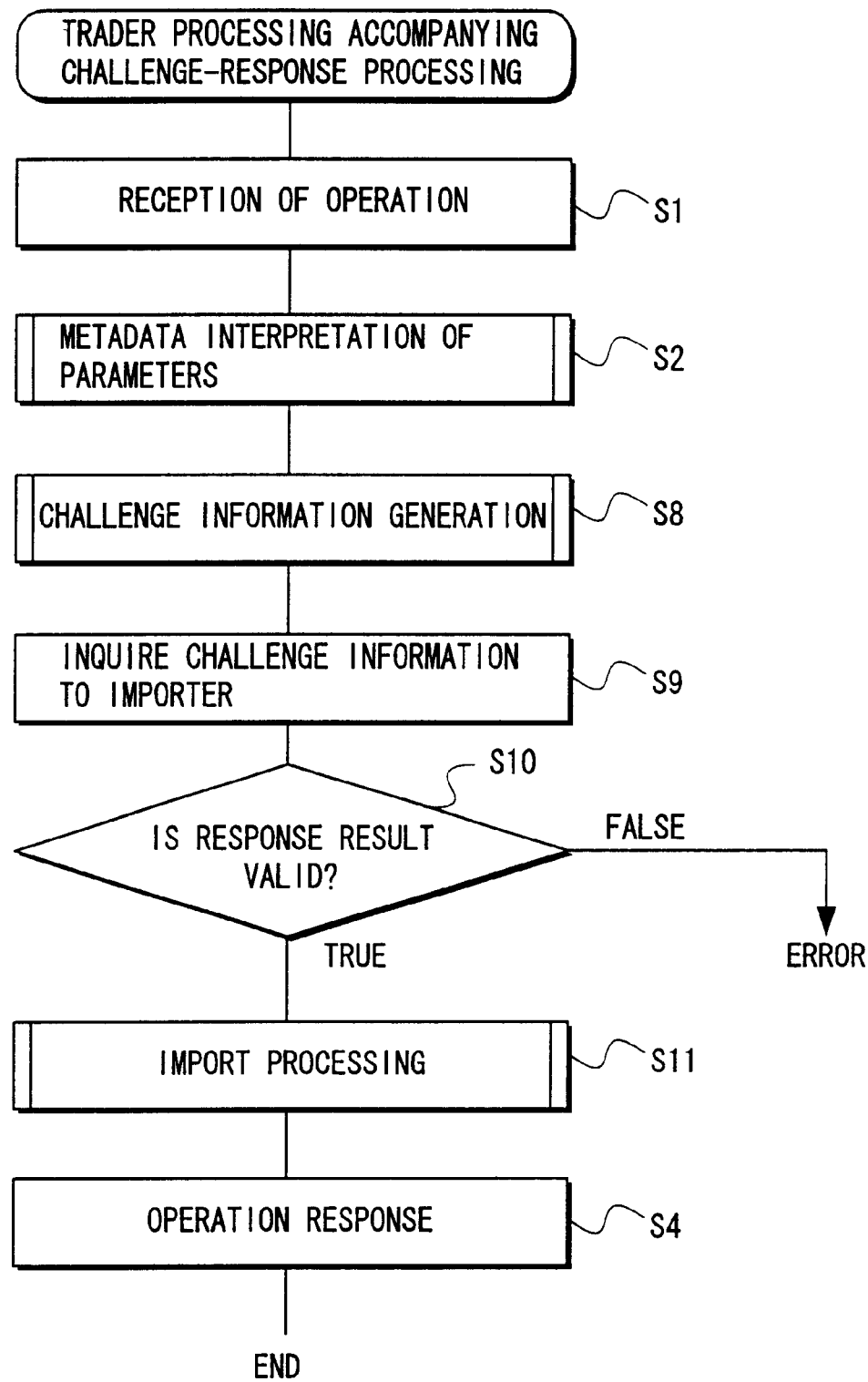
FIG. 8 is a flow chart illustrating a procedure of challenge-response processing in a trading system according to the present invention.

(4) Metadata Description Embodiment of the Entire Operation (see FIG. 1B)

(4.1) Operation of Metadata Generating Portion

The operation of metadata generating portion is similar to that per parameter as described in the above (3.1).

(4.2) Operation of Interface

The interface of the trader 1 is newly made. FIG. 17A shows an interface example. Namely, the CORBA.IDL definition is "string operation" and its "description" includes the metadata description of a series of operation groups. Such description is made as shown in the FIG. 17B at the metadata generating portion.

(4.3) Operation of Metadata Interpreting Portion

The operation of the metadata interpreting portion in the trader is similar to that per parameter as described in the above (3.3).

(4.4) Data Structure of Repository

For the data structure of the repository, that shown in FIG. 12 can be used.

Figure 18A:
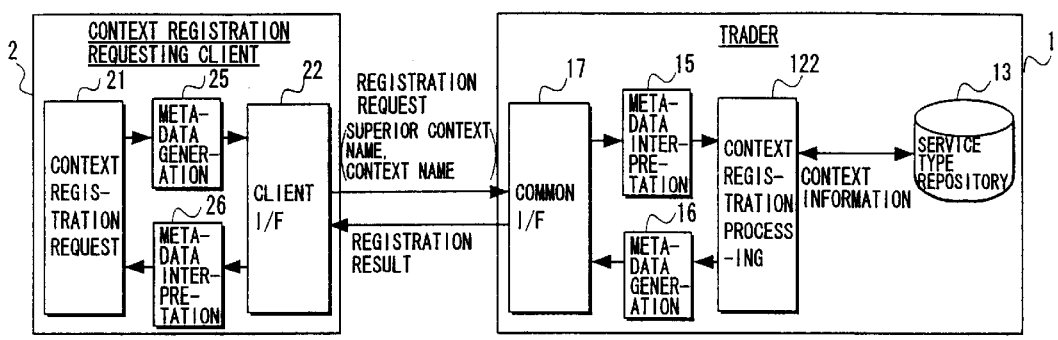
FIGS. 18A–18D are block diagrams illustrating an operation embodiment (2) of a trading system according to the present invention.

(4.5) Service Type Context Registration Processing (see FIG. 18A)

1) Interface Definition

In case of describing the parameters of the service type context-registration processing request all together as metadata, the parameter in the processing request including the service type context should be described as a single metadata.

For example, a metadata description indicating a statement "Register ContextY as a subordinate context of ContextX." is given as

```
[node1]    --- InstanceOf    ---> [RDF:Property]
           +-- PropName      ---> [traderns:InstanceOf]
           +-- PropObj       ---> [ContextY]
           +-- value         ---> [CORBASvcTypeContext]
[node1]    --- add_context   ---> [someone]
[contextY] --- ContextOf     ---> [contextX]
```

This can be rewritten in the following character string form:

```
<rdf:RDF>
  <rdf:Description>
    <rdf:propObj ContextY/>
    <rdf:propName traderns:InstanceOf/>
    <rdf:value CORBASvcTypeContext/>
    <rdf:instanceOf Property/>
    <Traderns:add _context traderns:someone/>
  </rdf:Description>
  </rdf:Description about = "contextY"
     traderns:ContextOf="contextX"/>
  <rdf:RDF>
```

2) Operations

The operations of the service type context-registration requesting client 2 and the trader 1 are shown in FIG. 18A. The service type context registration request processing portion 21 calls the metadata generating portion 25 to generate a collective metadata description of all the parameters including the service type context information and to call the common interface 17 of the trader 1 through the client interface 22.

The common interface 17 of the trader 1 transfers the metadata description to the metadata interpreting portion 15 which interprets the same to examine the contents of the processing request. If the processing request is a service type context registration request, the processing is transferred to the context registration processing portion 122. After the context registration processing, the result is transformed into the metadata description at the metadata generating portion 16 and returned to the client 2.

Figure 18B:
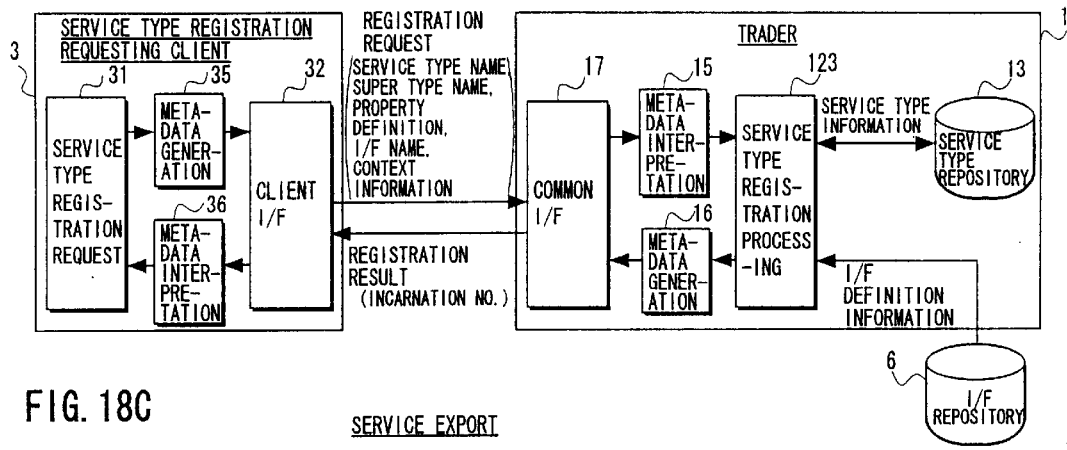

(4.6) Service Type Registration Processing (see FIG. 18B)

1) Interface Definition

In case of describing the parameters of the service type-registration processing request all together as a metadata, all of the parameters in the processing request should be described as a single metadata.

For example, a metadata description indicating a statement "Register SvcTypeC defined in ContextX. SvcTypeC is a sub type of SvcTypeA and B which has an Integer type property, PropertyD." is given as follows:

```
[node1]     --- InstanceOf           ---> [RDF:Property]
            +-- PropName             ---> [SvcTypeC]
            +-- PropObj              ---> [traderns:InstanceOf]
            +-- value                ---> [CORBASvcType]
[node1]     --- add_type             ---> [someone]
[contextX]  --- ContextOf            ---> [SvcTypeC]
[SvcTypeC]  --- traderns:SubTypeOf   ---> [SvcTypeA]
            +-- traderns:SubTypeOf   ---> [SvcTypeB]
[PropertyD] --- traderns:PropertyOf  ---> [SvcTypeC]
            +-- traderns:Type        ---> [Integer]
            +-- traderns:Mode        ---> [NORMAL]
```

This can be rewritten in the following character string form:

```
<rdf:RDF>
    <rdf:Description>
        <rdf:propObj SvcTypeC/>
        <rdf:propName traderns:InstanceOf/>
        <rdf:value CORBASvcType/>
        <rdf:instanceOf Property/>
        <Traderns:add_type traderns:someone/>
    </rdf:Description>
    <rdf:Description about="ContextX"
    traderns:ContextOf="SvcTypeC">
    <rdf:Description about="ServiceTypeC"
    traderns:SubtypeOf="SvcTypeA">
    <rdf:Description about="ServiceTypeC"
    traderns SubtypeOf="SvcTypeB">
    <rdf:Description about="Propertyd"
    traderns:PropertyOf="SvcTypeC">
    <rdf:Description about="Propertyd"
    traderns:Type="Integer">
    <rdf:Description about="Propertyd"
    traderns:Nomde="NORMAL">
</rdf:RDF>
```

2) Operations

The operations of the service type registration requesting client 3 and the trader 1 are shown in FIG. 18B. The service type registration request processing portion 31 calls the metadata generating portion 35, generates a collective metadata description of all the parameters including the service type context information, and calls the common interface 17 of the trader 1 through the client interface 32.

The common interface of the trader 1 transfers the metadata description to the metadata interpreting portion 15 for the interpretation thereof to examine the contents of the request. If the processing request is a service type registration request, the processing is transferred to the service type registration processing portion 123. After the service type registration processing, the result is transformed into metadata description at the metadata generating portion 16 and returned to the client 2.

Figure 18C:
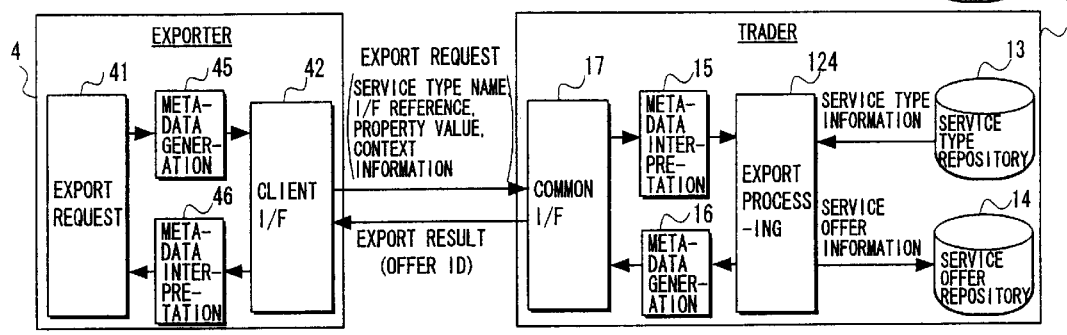

(4.7) Service Export Request Processing (see FIG. 18C)

1) Interface Definition

An export request processing can be defined by the CORBA.IDL as shown in FIG. 17A.

In case of describing the metadata of the service export request processing all together as a metadata, the metadata of the above-mentioned CORBA.IDL interface definition should be described all together as shown in FIG. 17B.

For example, a metadata description indicating a statement "Export SvcA (ServiceA). SvcA is a service of SvcTypeC in ContextX and the value of PropertyD is 0." is given as follows:

```
[node1]      --- propObj            ---> [ServiceA]
             +-- propName           ---> [traderns:InstanceOf]
             +-- value              ---> [SvcTypeC]
             +-- instanceOf         ---> [Property]
             +-- traderns:export    ---> [someone]
[ContextX]   --- traderns:contextOf ---> [SvcTypeC]
[PropertyD]  --- traderns:Value     ---> [0]
[ServiceA]   --- ifReference        ---> [ior:xxxxxxxxxxxxxx]
```

This can be rewritten in the following character string form:

```
<rdf:RDF>
    <rdf:Description>
        <rdf:propObj ServiceA/>
        <rdf:propName traderns:InstanceOf/>
        <rdf:value SvcTypeC/>
        <rdf:instanceOf Property/>
        <Traderns:export traderns:someone/>
    </rdf:Description>
    <rdf:Description about="ContextX"
    traderns:ContextOf="SvcTypeC">
    <rdf:Description about="PropertyD"
    traderns:Value="0">
    <rdf:Description about="ServiceA"
    ifReference="ior:xxxxxxxxxxxx">
</rdf:RDF>
```

2) Operations

The operations of the service exporter 4 and the trader 1 are shown in FIG. 18C. The service export processing portion 41 calls the metadata generating portion 45 to generate a collective metadata description of all the parameters including the service type context and calls the common interface 17 of the trader 1 through the client interface 42.

The common interface 17 of the trader 1 transfers the character string of the metadata description to the metadata interpreting portion 15 to examine the contents of the processing request. If the processing request is a service export request, the processing is transferred to the service export processing portion 124.

The processing result after the export processing is transformed into metadata description at the metadata generating portion 16 and returned to the exporter 4.

Figure 18D:
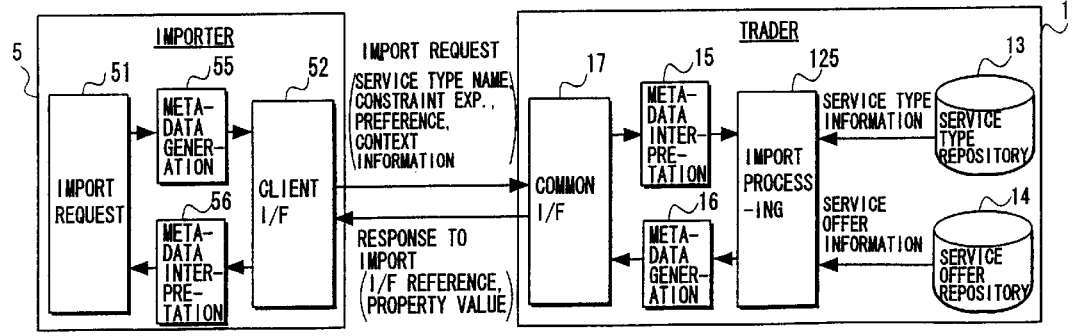

(4.8) Service Import Request Processing (see FIG. 18D)

1) Interface Definition

In case of describing the parameters of the service import request processing all together as a metadata, all of the parameters in the processing request should be described as a single metadata.

For example, a metadata description indicating a statement "Import services of SvcTypeC in ContextX. The constraint expression is "ttxxxxxxxx" and the preference is "yyyyyy"." is given as follows:

```
[node1]      --- propObj              ---> [SvcTypeC]
             +-- propName             ---> [traderns:InstanceOf]
             +-- value                ---> [CORBASvc]
             +-- instanceOf           ---> [Property]
             +-- traderns:query       ---> [someone]
[ContextX]   --- traderns:contextOf   ---> [SvcTypeC]
[constr]     --- Value                ---> "xxxxxxxx"
[pref]       --- Value                ---> "yyyyyyyy"
```

This can be rewritten in the following character string form:

```
<rdf:RDF>
    <rdf:Description>
        <rdf:propObj SvcTypeC/>
        <rdf:propName traderns:InstanceOf/>
        <rdf:value CORBASvc/>
        <rdf:instanceOf Property/>
        <traderns:query traderns:someone/>
    </rdf:Description>
<rdf:Description about="ContextX"
traderns:ContextOf="SvcTypeC">
    <rdf:Description about="constr"
    traderns:Value="xxx">
    <rdf:Description about="pref"
    traderns:Value="yyy">
</rdf:RDF>
```

2) Operations

The operations of the service importer 5 and the trader 1 are shown in FIG. 18D. A service import processing portion 51 calls the metadata generating portion 55 to generate a collective metadata description of all the parameters including the service type context, and calls the common interface 17 of the trader 1 through the client interface 52.

The common interface 17 of the trader 1 transfers the character string of the metadata description to the metadata interpreting portion to examine the contents of the processing request. If the processing request is a service import request, the processing is transferred to the import processing portion 125. The information of the imported service group is transformed into metadata description at the metadata generating portion 16 and returned to the importer 5.

(5) Service Type Context Processing

The service type context of the parameter in each of the above-mentioned operations is realized as follows, thereby avoiding the collision of service type names or adjusting the concepts indicated by service types.

Figure 19:
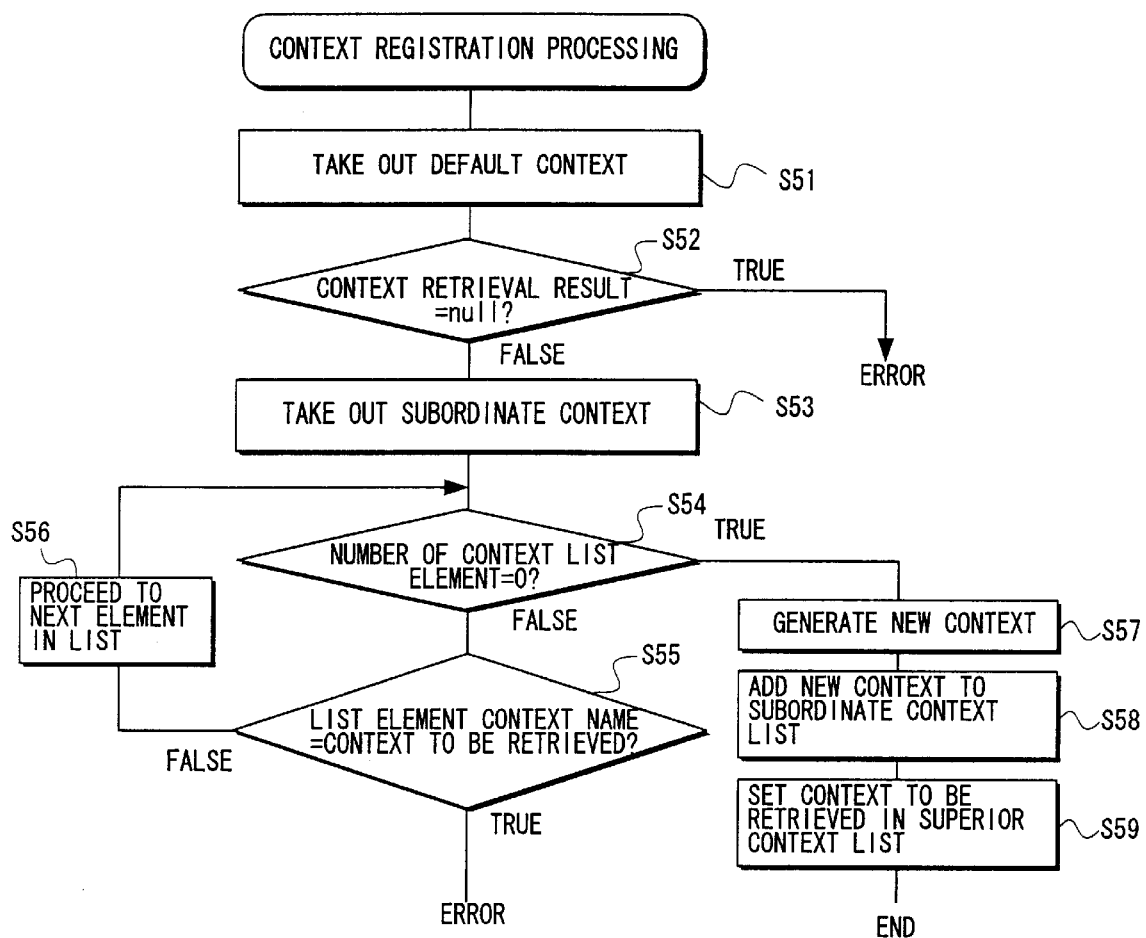
FIG. 19 is a flow chart illustrating a registration processing of a service type context in a trading system according to the present invention.

(5.1) Operation of Service Type Context Registration Processing Portion (see FIGS. 15A, 18A and 19)

Having received the parameter from the metadata interpreting portion 15, the service type context registration processing portion 122 starts from the default context (step S51) to retrieve the superior service type context in which the service type context should be registered (step S52). If the designated context is not found, the processing is found to be an error.

Next, the context list included in the super context is taken out (step S53) and examined if there are any duplicate names with the existing context (steps S54–S56). If there is no context with a duplicate name, a new context is made and added to the subordinate context list in the superior context (steps S57–S59).

Figure 20:
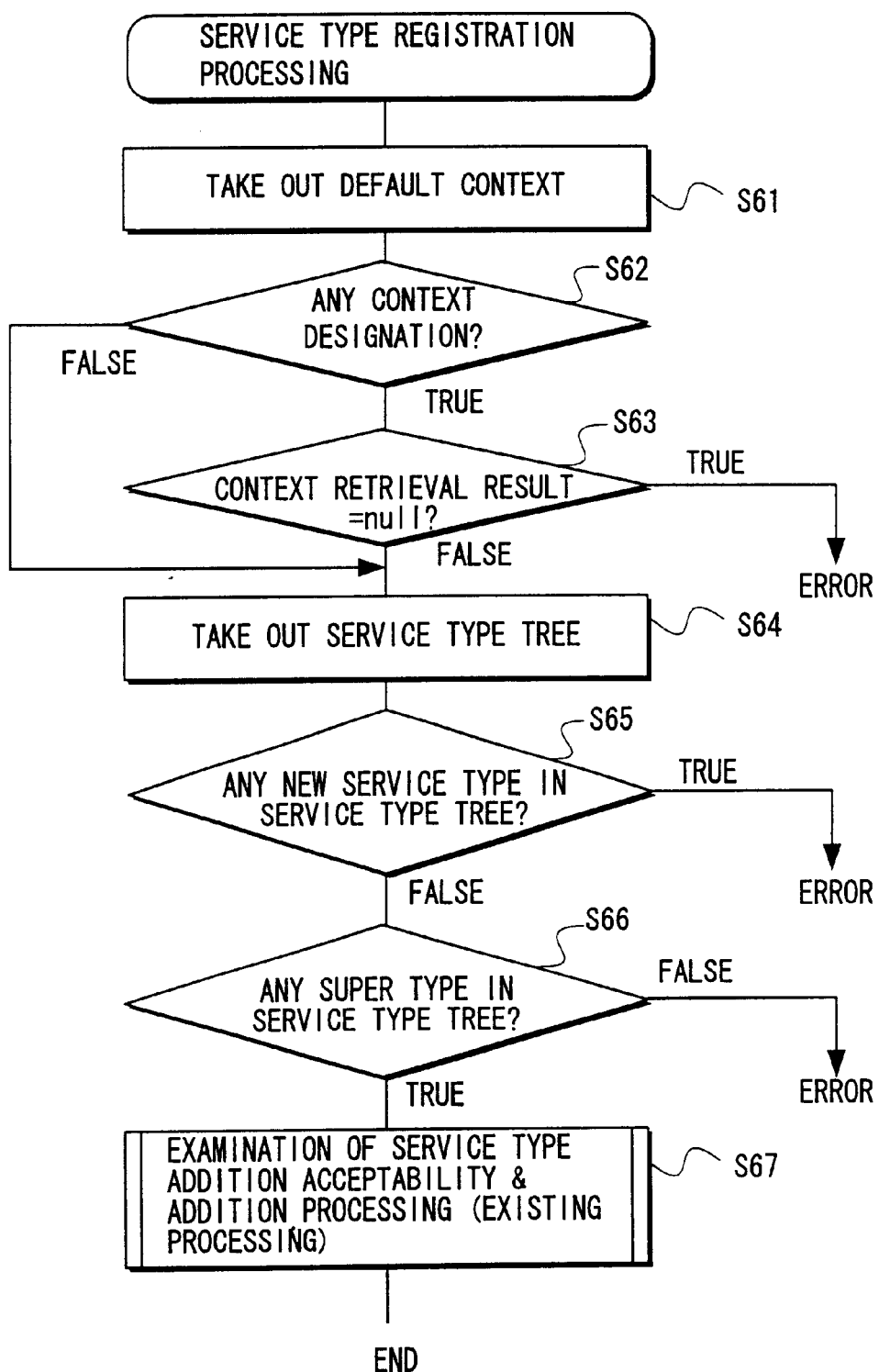
FIG. 20 is a flow chart illustrating a registration processing of a service type in a trading system according to the present invention.

(5.2) Operation of Service Type Registration Processing Portion (see FIG. 15B, 18B and 20)

Having received the parameter from the metadata interpreting portion 15, the service type registration processing portion 123 starts from the default context to retrieve the service type context in which the service type should be registered from the service type repository (steps S61–63).

If there is no service type context designation, the processing is handled as the default context designation. If the designated service type context is not found, the processing is found to be an error.

After obtaining the service type context of the destination of the registration, the service type context is examined for the duplication between the new service type name and the existing service type name. If the names are duplicated, the processing is found to be an error (steps S64, S65).

Next, the super type is retrieved in the context. If the super type does not exist, the processing is found to be an error (step S66). After the examination, the new service type is stored in the corresponding service type context of the service type repository 13 with the processing similar to that in the registration of the existing service type (step S67).

Figure 21:
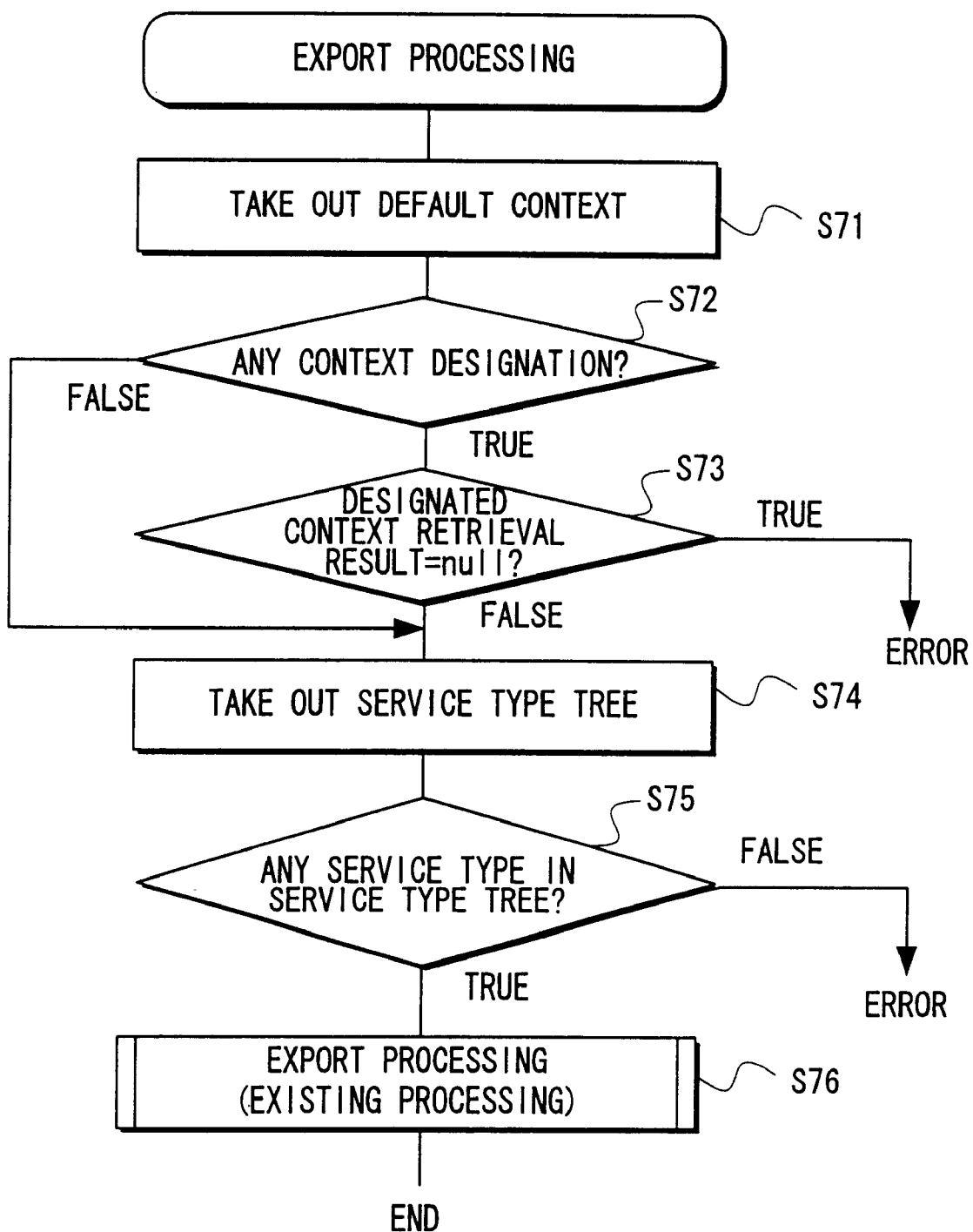
FIG. 21 is a flow chart illustrating an export processing in a trading system according to the present invention.

(5.3) Operation of Service Export Processing Portion (see FIGS. 15C, 18C, and 21)

Having received the parameter from the metadata interpreting portion 15, the service export processing portion 124 starts from the default context to retrieve the service type context of the designated service type (steps S71–73).

If there is no service type context designation, the processing is handled as the default context designation. If the designated service type context is not found, the processing is found to be an error.

After finishing the retrieval of service type context, the service type is retrieved in the service type context (steps S74, S75). If the designated service type does not exist, the processing is found to be an error. After finishing the retrieval, the processing is performed in the same way as the existing service export (step S76).

Namely, if the property type of the exported service coincides with the property type defined in the service type and if all of the property values required by the service type definition are given, the validity of the export is confirmed and the service is registered in an appropriate entry of the service offer repository.

Figure 22:
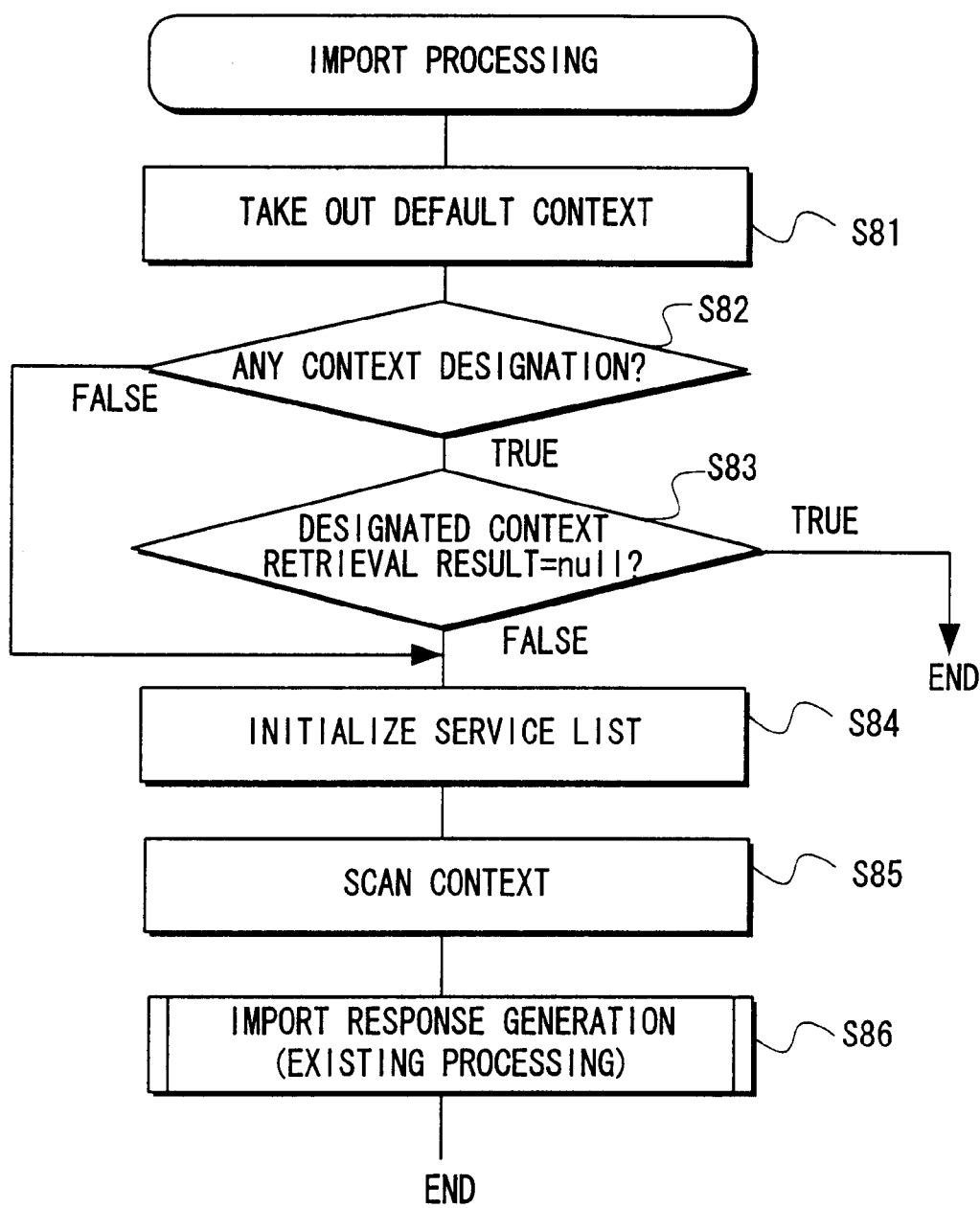
FIG. 22 is a flow chart illustrating an import processing in a trading system according to the present invention.

(5.4) Operation of Service Import Processing Portion (see FIGS. 15D, 18D and 22)

Having received the parameter from the metadata interpreting portion 15, the service import processing portion 125 starts from the default context to retrieve the service type context of the designated service type (steps S81–83). If there is no service type context designation, the processing is handled as the default context designation. If the designated service type context is not found, the processing is found to be an error.

After finishing the retrieval of service type context, the service type context included in the context is scanned starting from the context (step S84, S85). The service type context included in the context is recursively examined to find the service type coinciding with that import-requested among the service types in the context. Then the corresponding service type is added to the service list for saving the retrieval result.

After scanning all of the service types, the service list is subjected to an ordinary import response data-generation processing (step S86).

Figure 23:
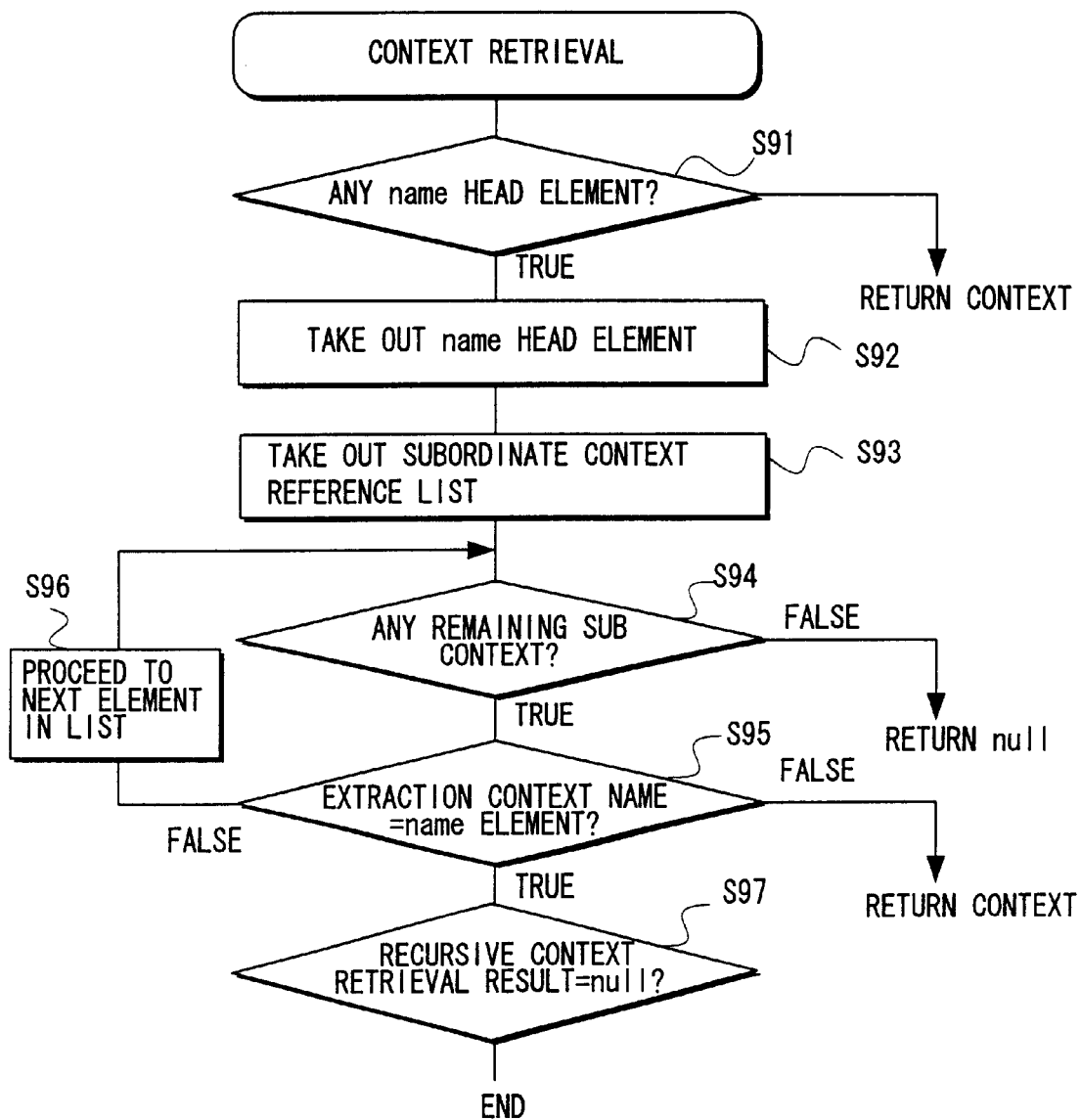
FIG. 23 is a flow chart illustrating a context retrieval in a trading system according to the present invention.
Figure 24:
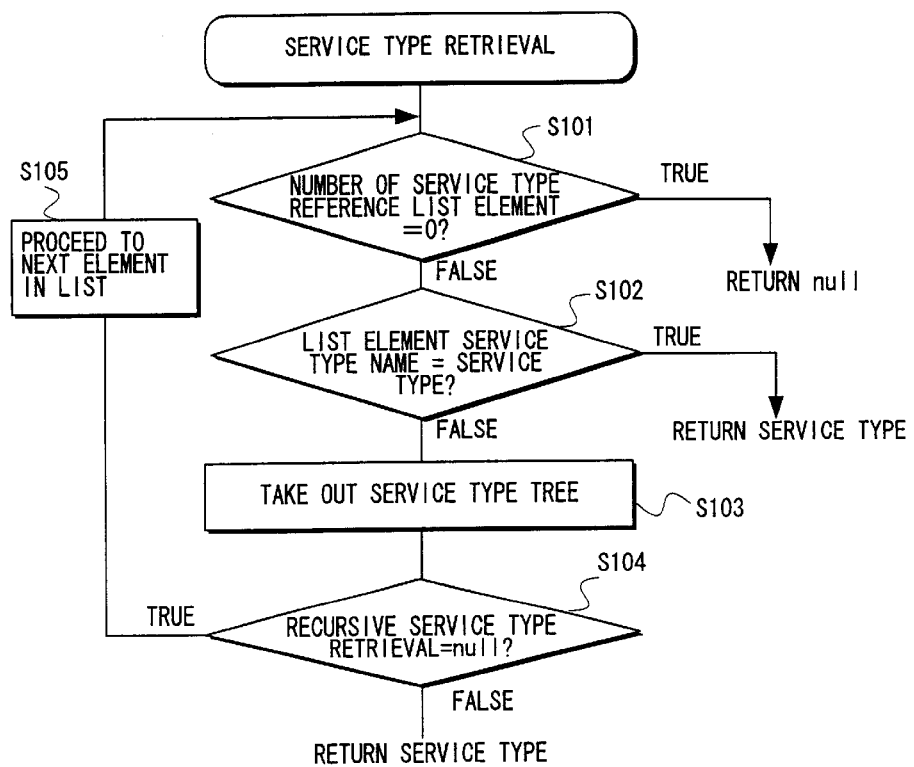
FIG. 24 is a flow chart illustrating a service type retrieval in a trading system according to the present invention.
Figure 25:
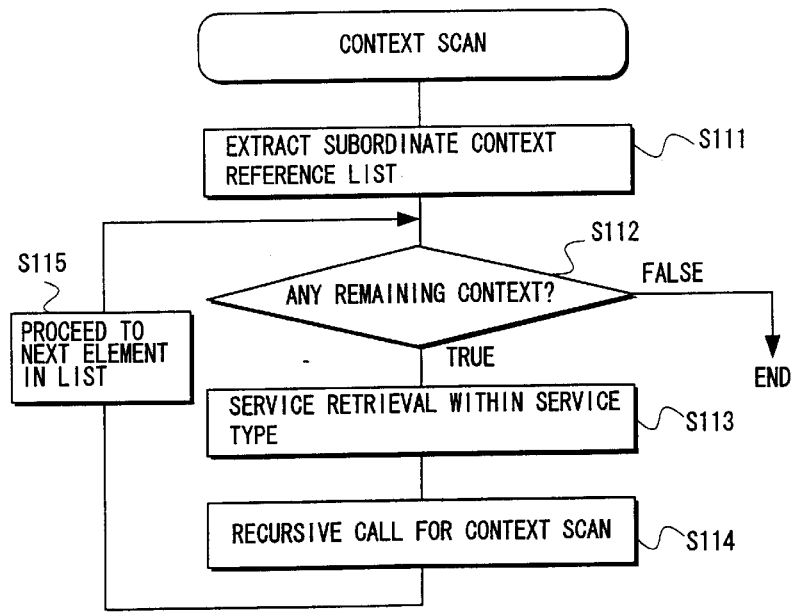
FIG. 25 is a flow chart illustrating a context scan in a trading system according to the present invention.

It is to be noted that the above-mentioned service type-context retrieval (S52, S63, S73, S83), the service type retrieval (S65, S66, S75), and the context scan (S85) are performed according to the procedures shown in FIGS. 23, 24, and FIG. 25, respectively.

Figure 26:
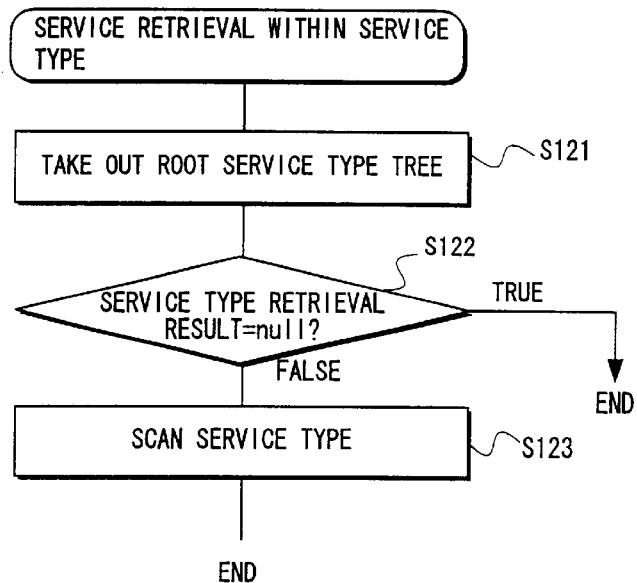
FIG. 26 is a flow chart illustrating a service retrieval within a service type in a trading system according to the present invention.
Figure 27:
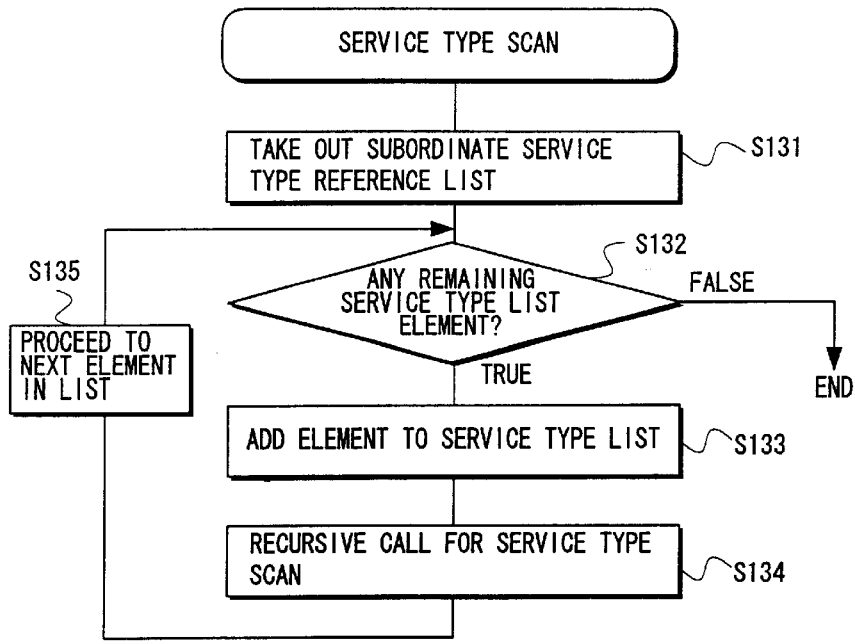
FIG. 27 is a flow chart illustrating a service type scan in a trading system according to the present invention.

The service retrieval while scanning the contexts (S113) is executed by the flow shown in FIG. 26. The service type scanning while retrieving the service is executed by the flow shown in FIG. 27.

(6) Authentication Processing

If the contents of the operations are described all together as a single metadata as mentioned above, the client authentication by the trader can be performed by including the description related to the client of the trader itself within the operation.

Figure 28:
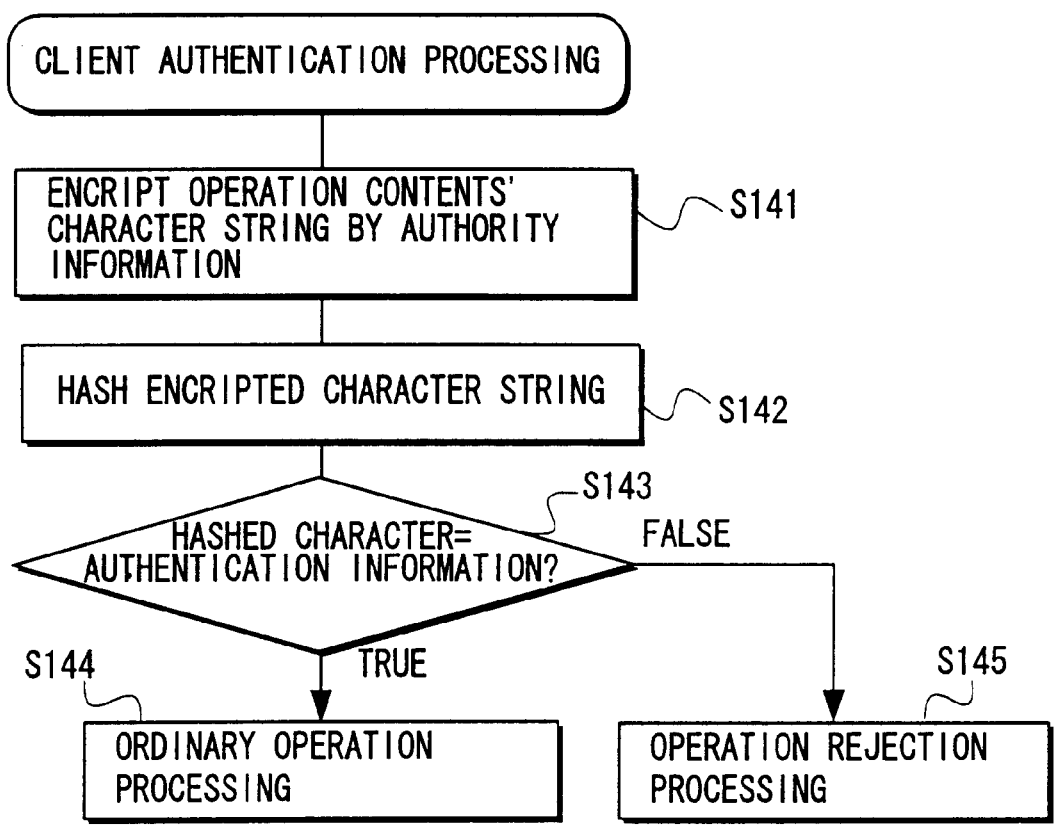
FIG. 28 is a flow chart illustrating an authentication processing in a trading system according to the present invention.

(6.1) Overall Processing Flow (see FIG. 28)

As mentioned above, when performing the client authentication, the request from the client should include the authentication information indicating the authority for performing the request and the authority information indicating the authority required for accessing (i.e. adding, deleting, and the like) such information as service type contexts, service types, and the like newly made in the trader 1.

Having received the request including the authentication information and the authority information, the trader extracts the information at the metadata interpreting portion and transfers the processings to each processing portion. Each processing portion examines the existence of the authentication information if the authority is set in processing objects such as the service type context, the service type, and the like. If not so, the processing is found to be an error.

If the authentication information exists, it is compared with the authority information of the processing object to examine the signature. If the signature is appropriate, the processing is continued, while if not so, the processing is found to be an error. The authentication is performed by the following procedure:

1) A cryptogram is made by encrypting the character string describing the operation by using the encryption method indicated by encryption method information in the processing request from the client (step S141). In this case, the encryption is performed using the authority information in the repository 13. As for this authority information, only the authority information on the default context (1311 in FIG. 14) is preliminarily prepared in the repository 13.
2) The cryptogram is hashed using the hash method indicated by hash method information in the processing request (step S142) and compared with the authentication information from the client (step S143). This is because the authority information and the authentication information are set to have a mutually specific relationship.
3) If both information are found equal as a result of the preceding clause 2), it is found to be a request from an appropriate client so that the ordinary operation processing is performed (step S144). Namely, the information on the request of the new registration processing or the export processing is stored in the repository 13 with the authority information transferred together from the client. If both information are not equal, the operation is rejected (step S145).

Namely, when generating the service type context, the service type, and the like, or modifying the information as a result of the processing, the existence of the authority information to be set as the processing object is examined. If the authority information exists, the information is set as an attribute of the processing object such as the service type context or the service type.

(6.2) Service Type Context Registration-request Processing Accompanying Authentication (see FIG. 29A)
  1) Interface Definition
  When performing the authentication, the client's signature, the encrypted algorithm information of the signature, the hashed algorithm information of the signature, and the like are transferred as the information of the service type context registration requesting client 2.

For example, a statement describing such information, "A client (someone) affixes the signature "sign1" to the service type context registration. The whereabouts of the client information or of the public key is "xxxxxx", and the sign1 is encrypted by "RSAcrypto" and hashed by "MD5"." can be expressed with metadata as follows:

```
[someone]   --- traderns:signs        ---> [sign1]
            +-- traderns:identified   ---> [xxxxxxxxxxx]
[sign1]     --- traderns:signedWith   ---> "RSAcrypto"
            +-- traderns:hashedWith   ---> "MD5"
```

Furthermore, when adding the authority information for restricting those who can register the service type context and the service type under that service type context, such information is also described with metadata.

Figure 29A:
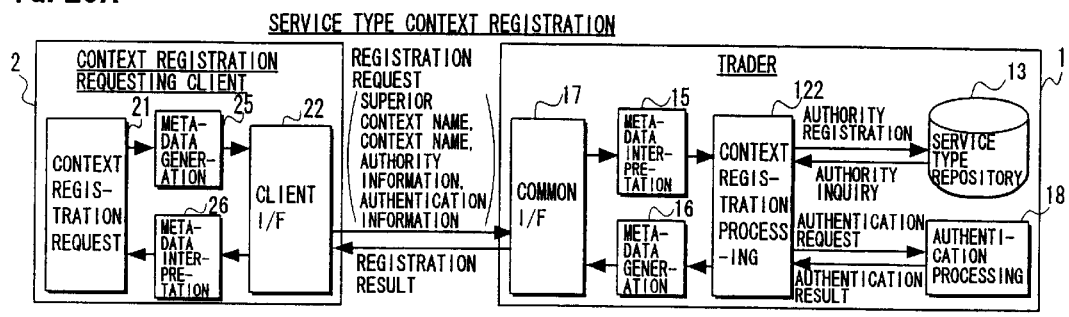
FIGS. 29A–29E are block diagrams illustrating an operation embodiment (3) of a trading system according to the present invention.

For example, a metadata description indicating a statement "The authority for registering a service type context under the service type context Y is "xx"." is given as follows:
  [contexty] - - - traderns:contextAuthority→"xx"
  A metadata description indicating a statement "The authority for registering a service type of the service type context Y is "yy"." is given as follows:
  [contexty] - - - traderns:serviceTypeAuthority→"yy"
  2) Operations
  The operations of the service type context registration requesting client 2 and the trader 1 in the case accompanied by authentication are shown in FIG. 29A. The service type context registration request processing portion 21 calls the metadata generating portion 25 to generate a collective metadata description of all the parameters including the above-mentioned authentication information, and calls the common interface of the trader through the client interface 22.

The common interface 17 of the trader 1 transfers the metadata description to the metadata interpreting portion 15 for the interpretation thereof to examine the contents of the processing request. If the processing request is a service type context registration request, the processing is transferred to the service type context registration processing portion 122.

The context registration processing portion 122 takes out the authority information of the superior service type context from the service type repository 13 to perform the authentication processing together with the authentication information in the request at the authentication processing portion 18.

After the success of authentication, the processing is performed similarly to the case without authentication. After the completion of processing, the authority information is set in the newly made service type context. Then, the processing result is transformed into the metadata description at the metadata generating portion 16 and returned to the client 2.

(6.3) Service Type Registration Request Processing Accompanying Authentication (see FIG. 29B)
  1) Interface Definition
  When performing the authentication, the client's signature, the encrypted algorithm information of the signature, the hashed algorithm information of the signature, and the like are transferred as the information of the service type registration requesting client. The statement describing such information is the same as mentioned above.

Furthermore, when adding the authority information for restricting those who can register the sub type in this service type, such information is also described with metadata. For example, a metadata description indicating a statement "The authority for registering a sub type of the service type A is "xx"." is given as follows:

[serviceTypeA] - - - traderns:subTypeAuthority→"xx"

A metadata description indicating a statement "The authority for exporting the service as service type A is "yy"." is given as follows:

[serviceTypeA] - - - traderns:exportAuthority→"yy"

2) Operations

Figure 29B:
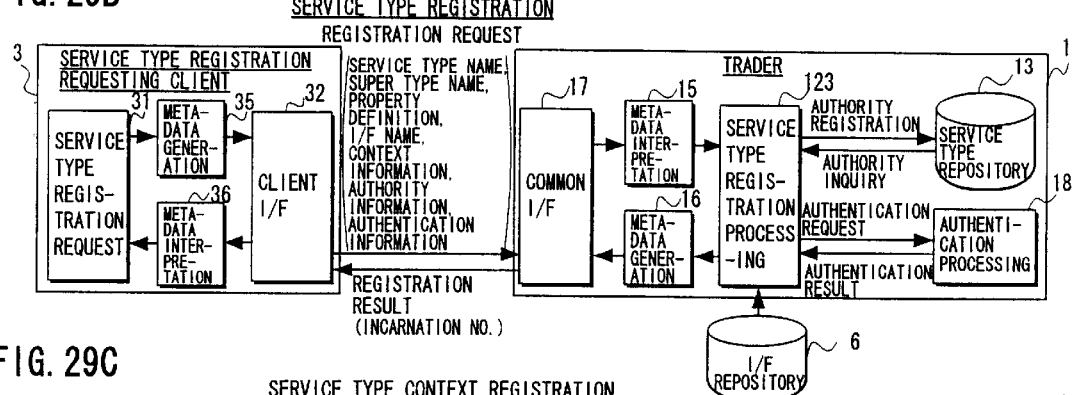

The operations of the service type registration requesting client 3 and the trader 1 in the case accompanied by authentication are shown in FIG. 29B. The service type registration request processing portion 31 calls the metadata generating portion 25, generates a collective metadata description of all the parameters including the above-mentioned authentication information, and calls the common interface of the trader through the client interface 22.

The common interface 17 of the trader 1 transfers the metadata description to the metadata interpreting portion 15 for the interpretation thereof to examine the contents of the processing request. If the processing request is a service type registration request, the processing is transferred to the service type registration processing portion 123.

The service type registration processing portion 123 takes out the authority information of the service type context and the authority information of the super type from the service type repository 13 to perform the authentication processing together with the authentication information in the request at the authentication processing portion 18.

After the success of authentication, the processing is performed similarly to the case without authentication. After the completion of processing, the authority information is set in the newly made service type. Then, the processing result is transformed into the metadata description at the metadata generating portion 16 and returned to the client 3.

Figure 29C:
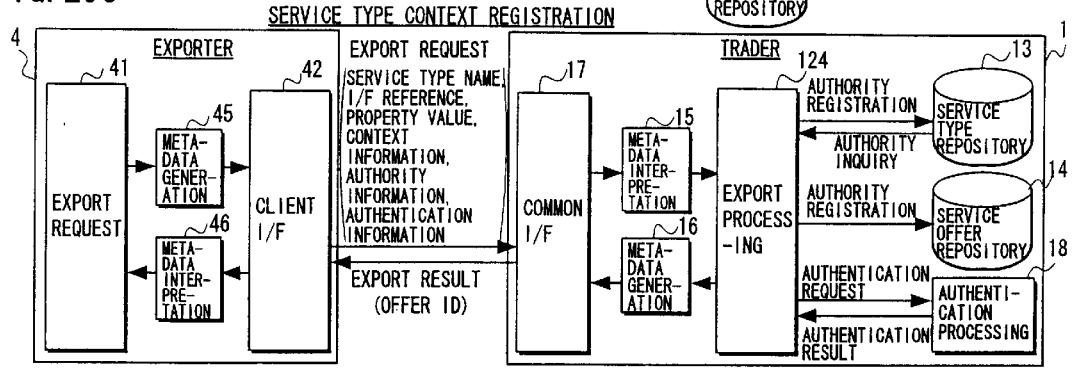

(6.4) Service Export Request Processing Accompanying Authentication (see FIG. 29C)

1) Interface Definition

When performing authentication, the exporter's signature, the encrypted algorithm information of the signature, the hashed algorithm information of the signature, and the like are transferred as the information of the exporter. The statement describing such information is the same as above-mentioned.

Furthermore, when adding the authority information for restricting those who can import this service, such information is also described with metadata. For example, a metadata description indicating a statement "The authority for importing the service type A is "yy"." is given as follows:

[contexty] - - - traderns:importAuthority→"xx"

2) Operations

The operations of the service exporter 4 and the trader 1 in the case accompanied by authentication are shown in FIG. 29C. The service export request processing portion 41 calls the metadata generating portion 124, generates a collective metadata description of all the parameters including the above-mentioned authentication information, and calls the common interface 17 of the trader through the client interface 42.

The common interface 17 of the trader 1 transfers the metadata description to the metadata interpreting portion 15 for the interpretation thereof to examine the contents of the processing request. If the processing request is a service export request, the processing is transferred to the service export processing portion 124.

The export processing portion 124 takes out the service type authority information from the service type repository 13 to perform the authentication processing together with the authentication information in the request at the authentication processing portion 18.

After the success of authentication, the processing is performed similarly to the case without authentication. After the completion of processing, an authority information is set in the newly made service in the service offer repository 14. Then, the processing result is transformed into the metadata description at the metadata generating portion 16 and returned to the service exporter 4.

Figure 29D:
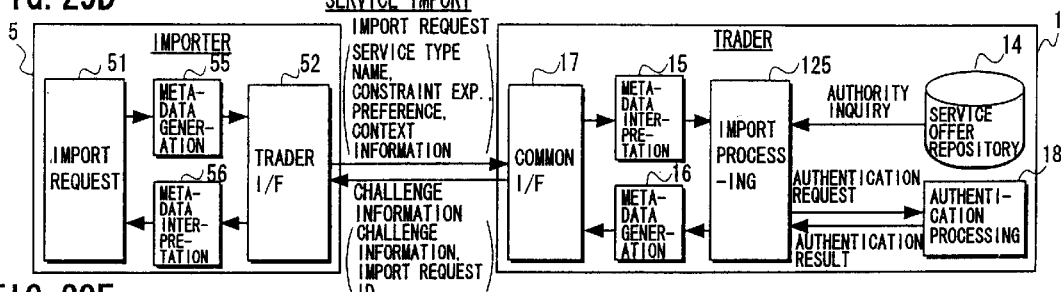

(6.5) Service Import Request Processing Accompanying Authentication (see FIG. 29D and E)

1) Interface Definition

When the importer 5 tries to import a service which requires authentication for an import request processing, the trader 1 returns challenge information required for the authentication and an import request ID which the trader has made corresponding to the import request. Both are expressed with metadata as follows:

```
[op1]   --- instanceOf    ---> [ServiceImportOperation]
        +-- operationId   ---> "00000000000"
        +-- importKey     ---> "11111111111"
```

This can be rewritten in the following character string form:

```
<rdf:RDF>
    <rdf:Description>
        <traderns:instanceOf ServiceImportOperation/>
        <traderns:operationId "0000000000"/>
        <traderns:importKey "1111111111"/>
    </rdf:RDF>
```

In response, the importer affixes signature to the challenge information. The signature is expressed with metadata description as follows:

```
[op1]    --- operationId      --->"00000000000"
         +-- signedWith        --->sign1
[sign1]  --- is                --->"zzzzzzzz..........zzzzzzz"
         --- isEncryptedWith   ---> "RSAcrypto"
         --- isHashedWith      ---> "MD5"
```

This can be rewritten in the following character string form:

```
<rdf:RDF>
    <rdf:Description about="op1"
    traderns:operationId="0000000">
    <rdf:Description about="op1"
    traderns:signedWith="sign1">
    <rdf:Description about="sign1"
    traderns:is="zzzz......zzzz"/>
    <rdf:Description about="sign1"
    traderns:isEncryptedWith="RSAcrypto"/>
```

-continued

```
<rdf:Description about="sign1"
    traderns:isHashedWith="MD5"/>
</rdf:RDF>
```

2) Operations

Figure 29E:
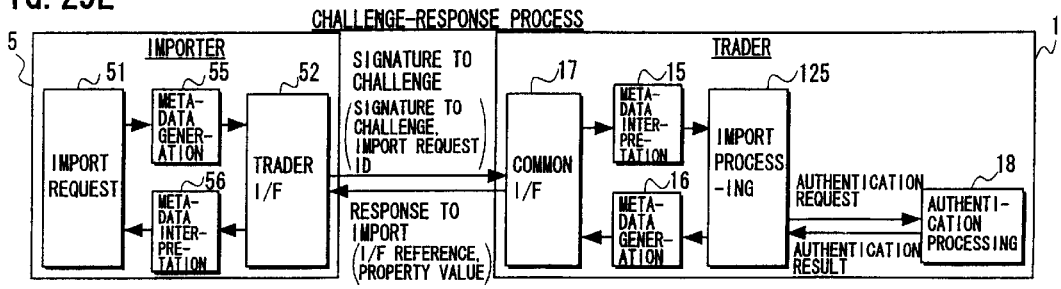
Figure 30:
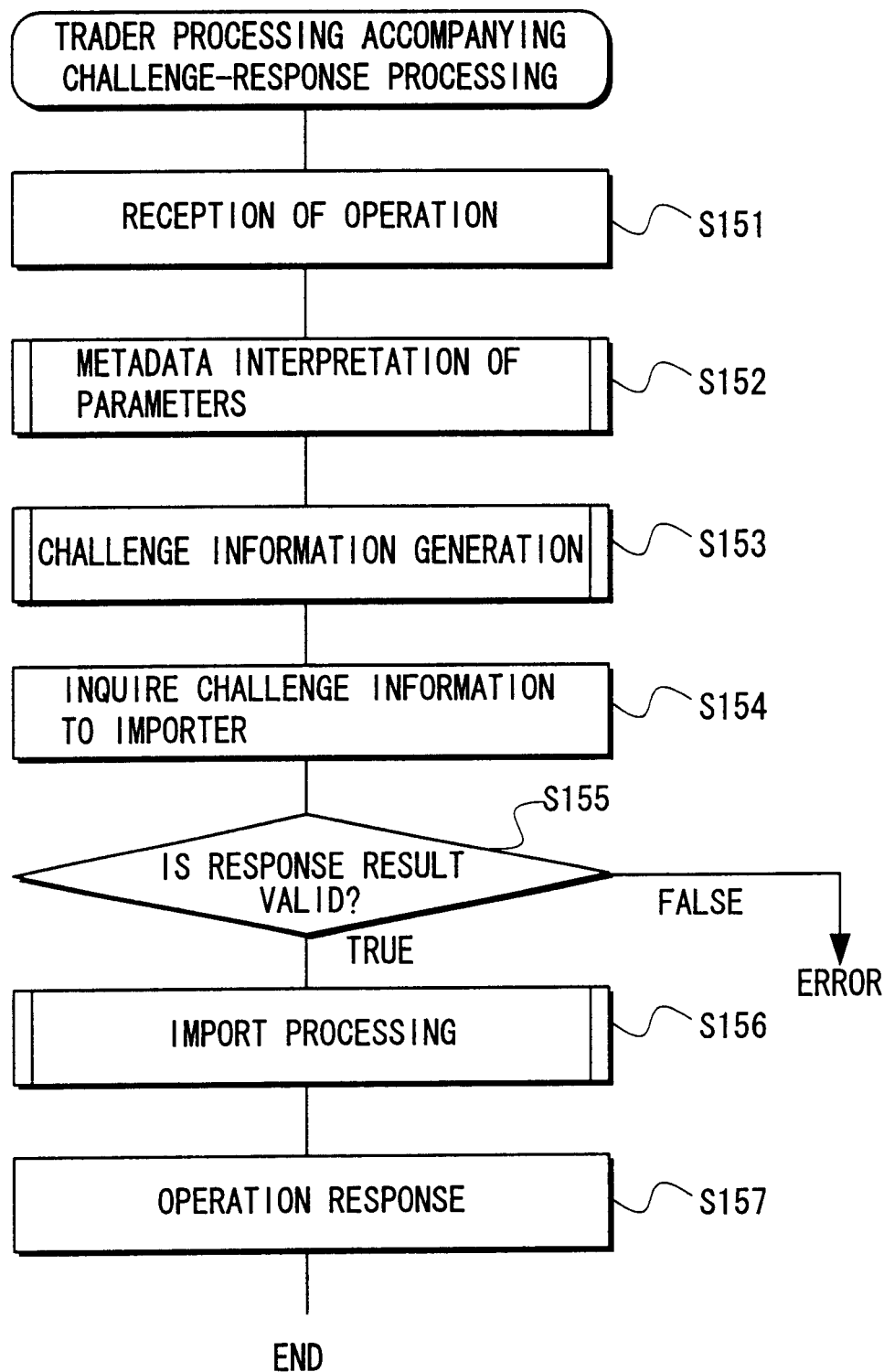
FIG. 30 is a flow chart illustrating a procedure of challenge-response processing in a trading system according to the present invention.
Figure 31A:
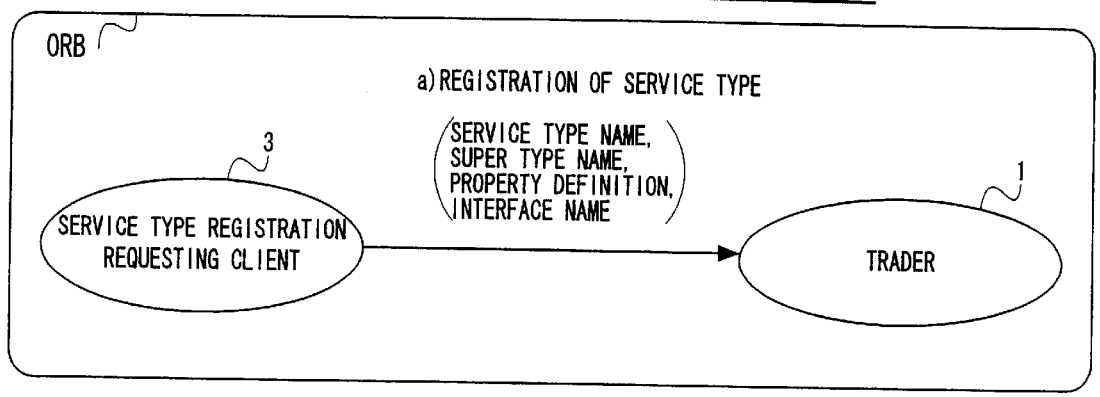
FIGS. 31A and 31B are sequence charts schematically illustrating an embodiment of a prior art trading system.
Figure 31B:
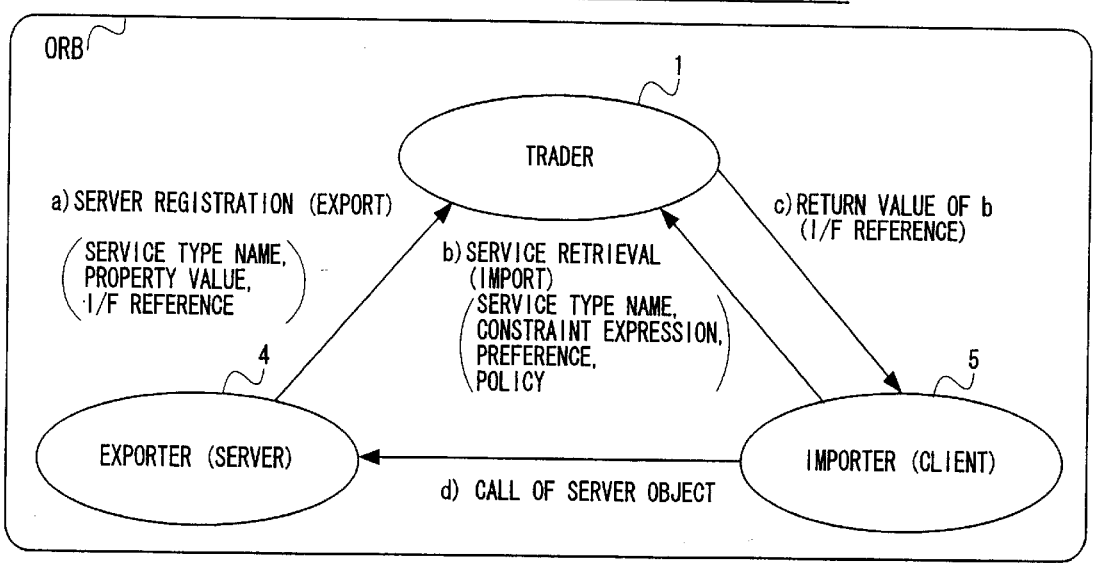
Figure 32:
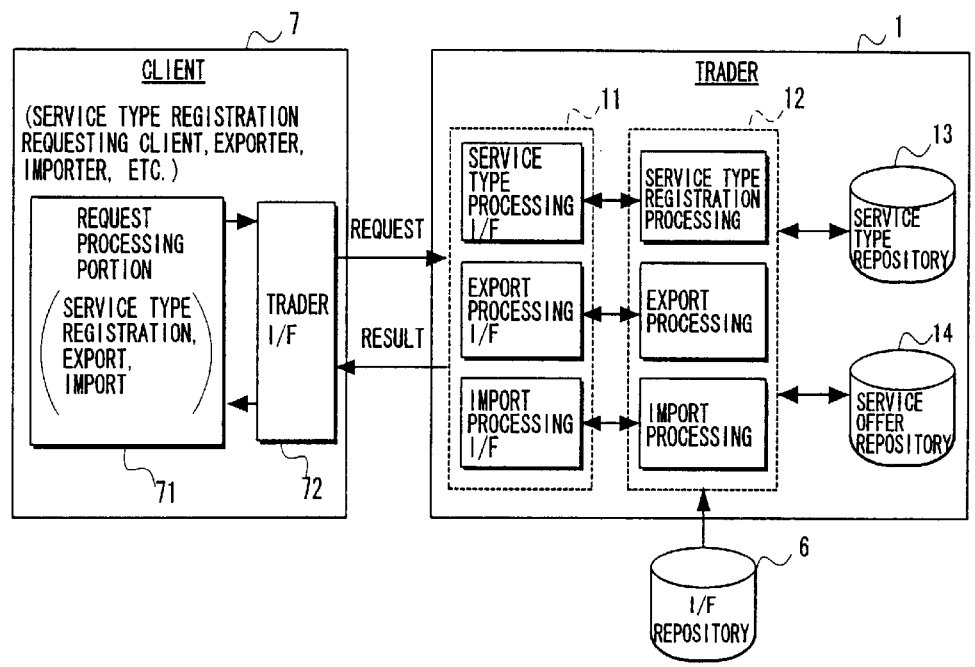
FIG. 32 is a block diagram schematically illustrating an arrangement of a prior art trading system.
Figure 34:
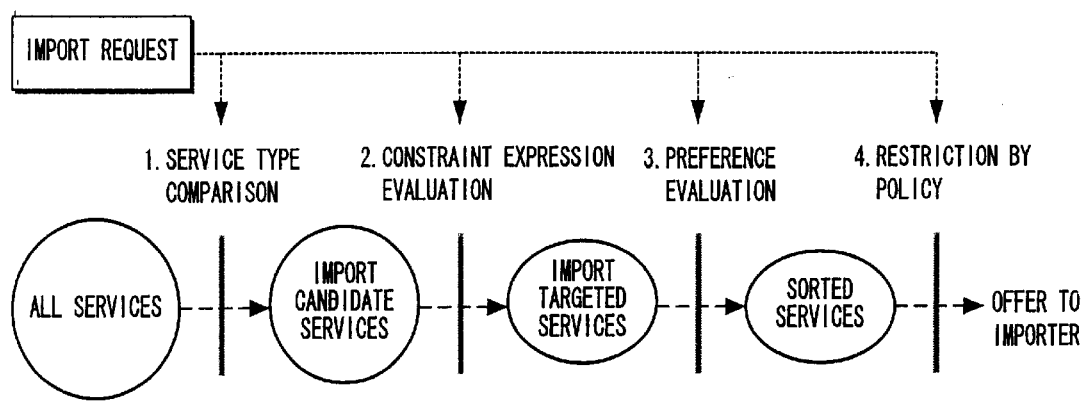
FIG. 34 is a diagram illustrating a screening processing in a prior art import processing.
Figure 33A:
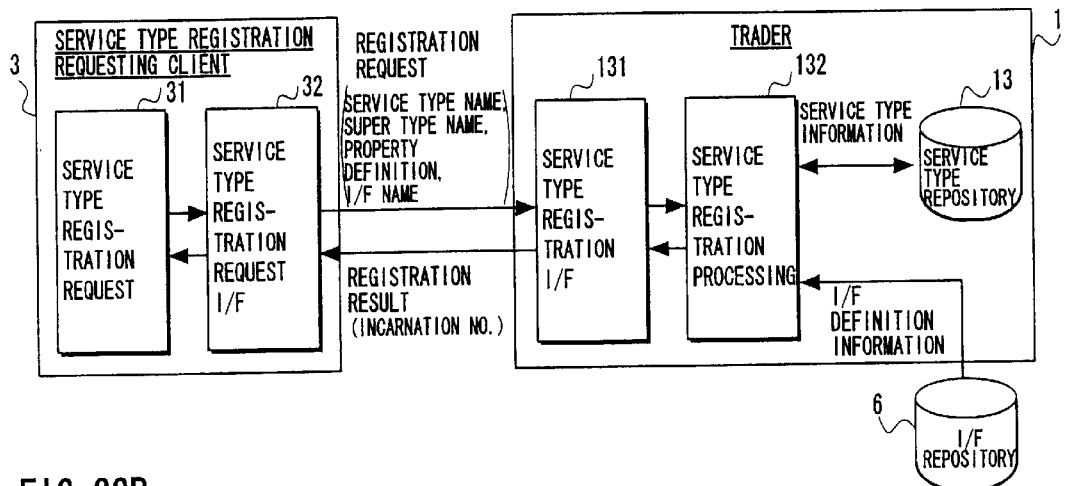
FIGS. 33A–33C are block diagrams schematically illustrating an arrangement of a prior art trading system.
Figure 33B:
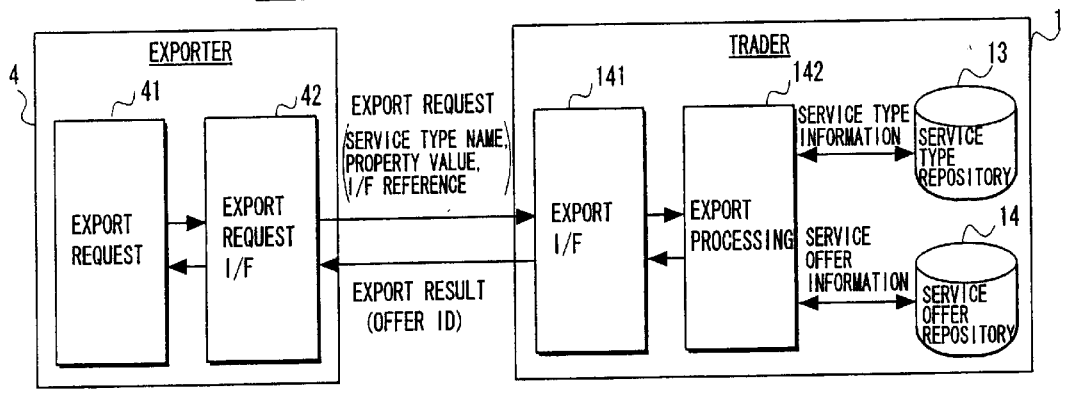
Figure 33C:
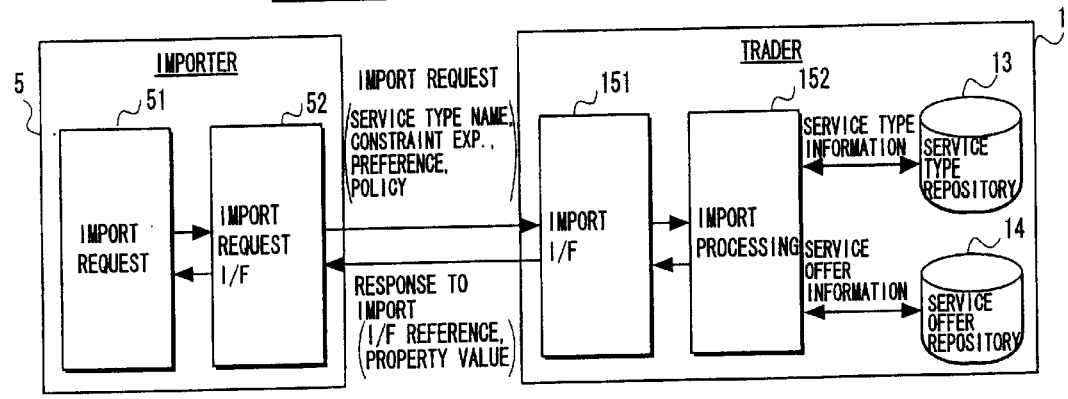

The operations of the service importer 5 and the trader 1 in the case accompanied by authentication are shown in FIG. 29D and 29E. The authentication of the importer 5 is performed according to the challenge-response procedure between the trader 1 and the importer 5 (see FIGS. 29E and 30).

The service import request processing portion 51 firstly calls the metadata generating portion 55 to generate a metadata description of the import request without any authentication information, and calls the common interface 17 of the trader 1 through the client interface 52.

The common interface 17 of the trader 1 transfers the metadata description to the metadata interpreting portion 15 for the interpretation thereof to examine the contents of the processing request (steps S151, S152). If the processing request is a service import request, the processing is transferred to the service import processing portion 125. The import processing portion 125 takes out the authority information of the service from the service offer repository 14 and requests the generation of the challenge information to the authentication processing portion 18 if the authentication is required (step S153).

The import processing portion 125 transforms the challenge information and the import request ID which is uniquely allocated to each import request into the metadata description at the metadata generating portion 16 to be returned to the client (step S154).

Having received the challenge information in metadata description, the importer 5 interprets the challenge information at the metadata interpreting portion 56. Then the import request processing portion 51 affixes the signature on the challenge information and transfers it to the trader 1.

The trader 1 checks the signature on the challenge information (step S155), performs the ordinary import processing if the authority is proven (step S156), and transforms the import result into metadata form to be returned to the client 5 (step S157).

Following effects are obtained by the trading system according to the present invention:

[1] Avoidance of Collision of Service Type Names

Restriction such that a service type name must be unique in a trader can be removed. By using context names in order to avoid collisions of service type names, the client of the trader is made to consider the object for the service and the area where the service is applicable, so that the confusion of names caused by the service type as a mere character string can be avoided.

Additionally, at the time of import in case where services saved by a plurality of traders are provided to the importer as a result of the link operation, the service types are classified by the context names and the importer can designate an appropriate context name whereby the importer can obtain only the service of its desired service type. Moreover, by describing this context with the metadata description, the freedom degree of describing the service type is enhanced.

[2] Client Authentication by Trader

The trader receives requests such as the service type registration request and the export processing from various clients, and renews the information in the service type repository and service offer repository at every reception. By the trader having the authentication procedure, processing requests from malicious clients can be rejected. As a result, the information in the service type repository and the service offer repository can be safely kept.

By performing this authentication procedure with the metadata description, an encryption algorithm for authentication such as the hash method can be switched over and used arbitrarily without any additional parameters. Furthermore, an extendibility such as a plurality of encryption algorithms used together can be provided.

[3] Import Processing Authority

By the trader returning the challenge information to the importer and permitting the import request processing only to the importer who properly returns the authentication information to the challenge information, the exporter is enabled to publicize the service to only a part of objects, thus preventing the use of the server object by illegal clients.

By performing this authentication procedure with the metadata description, the extendibility can be secured as mentioned in the preceding clause.

What we claim is:

1. A trading system having a plurality of clients and a trader which are mutually connected on a distributed object oriented environment, each client and the trader respectively comprising:

a metadata generating portion for describing character string type parameters of each operation and an operation name within an interface all together with metadata including a service type and a service type context which is superior information of the service type; and a metadata interpreting portion for interpreting the metadata in its entirety, wherein a client which requests a registration of the service type context in the trader includes authentication information indicating that the client has an authority required for the registration and authority information indicating an authority for newly registering a service type context under a new service type context in the metadata at the metadata generating portion, and the trader interprets the metadata in its entirety at the metadata interpreting portion to extract the authentication information and the authority information, whereby an authentication processing portion of the trader perform a registration authentication processing of the service type context based on the authentication information and the authority information.

2. A trading system having a plurality of clients and a trader which are mutually connected on a distributed object oriented environment, each client and the trader respectively comprising:

a metadata generating portion for describing character string type parameters of each operation and an operation name within an interface all together with metadata including a service type and a service type context which is superior information of the service type; and a metadata interpreting portion for interpreting the metadata in its entirety, wherein a client which requests a registration of the service type in the trader includes authentication information indicating that the client has an authority required for the registration and authority information indicating an authority for newly registering a sub type under a new service type in the metadata at the metadata generating portion, and the trader interprets the metadata at the metadata interpreting portion to extract the authentication information and the authority information, whereby an authentication processing portion of the trader performs a registration authentication processing of the service type based on the authentication information and the authority information.

3. A trading system having a plurality of clients and a trader which are mutually connected on a distributed object oriented environment, each client and the trader respectively comprising:

a metadata generating portion for describing character string type parameters of each operation and an operation name within an interface all together with metadata including a service type and a service type context which is superior information of the service type; and a metadata interpreting portion for interpreting the metadata in its entirety, wherein a client which requests a registration of the service type context in the trader includes authentication information indicating that the client has an authority required for the registration and authority information indicating an authority for registering a service type to a new service type context in the metadata at the metadata generating portion, and the trader interprets the metadata at the metadata interpreting portion to extract the authentication information and the authority information, whereby an authentication processing portion of the trader performs a registration authentication processing of the service type context based on the authentication information and the authority information.

4. A trading system having a plurality of clients and a trader which are mutually connected on a distributed object oriented environment, each client and the trader respectively comprising:

a metadata generating portion for describing character string type parameters of each operation and an operation name within an interface all together with metadata including a service type and a service type context which is superior information of the service type; and a metadata interpreting portion for interpreting the metadata in its entirety, wherein a client which requests a registration of the service type in the trader transforms authentication information indicating that the client has an authority required for the registration and authority information indicating an authority for export-processing the service as a new service type into the metadata at the metadata generating portion, and the trader interprets the metadata at the metadata interpreting portion to extract the authentication information and the authority information, whereby the authentication processing portion of the trader performs a registration authentication processing of the service type based on an authentication information and the authority information.

5. The trading system as claimed in claim 4 wherein the trader externally includes an interface repository as a database for saving a service interface definition required for testing a conformity of the service type.

6. A trading system having a plurality of clients and a trader which are mutually connected on a distributed object oriented environment, each client and the trader respectively comprising:

a metadata generating portion for describing character string type parameters of each operation and an operation name within an interface all together with metadata including a service type and a service type context which is superior information of the service type; and a metadata interpreting portion for interpreting the metadata in its entirety, wherein a client which performs a service export processing as an exporter to the trader describes authority information, with metadata, required by another client which performs a service import processing as an importer of a service for which the export processing is performed, the trader describes challenge information for authenticating the importer with metadata when the importer performs the service import processing, the importer in turn describes signature information corresponding to the challenge information with metadata, whereby the trader compares the challenge information with the signature information.

7. The trading system as claimed in claim 6 wherein the trader internally includes as a database;

a service type repository for saving the service type context and the service type information contained in the context, and a service offer repository for saving service information within the service type information, the service type repository saving authority information for a default context in advance, and the authentication processing portion permitting the import processing only when the signature information obtained from the client as a response to the challenge information coincides with the signature information generated based on the authority information from the client.

8. A trading system having a plurality of clients and a trader which are mutually connected on a distributed object oriented environment, each client and the trader respectively comprising:

a metadata generating portion for describing character string type parameters of each operation and an operation name within an interface all together with metadata including a service type and a service type context which is superior information of the service type; and a metadata interpreting portion for interpreting the metadata in its entirety, wherein the trader internally includes as a database;

a service type repository for saving the service type context and the service type information contained in the context and a service offer repository for saving service information within the service type information, the service type repository saving authority information for a default context in advance, and the authentication processing portion saving the service type information and the service information with the authority information in the service type repository and the service offer repository, respectively only when authentication information generated by encrypting the parameters based on the authority information from the client coincides with the authentication information from the client.

* * * * *